(12) United States Patent
Ionescu et al.

(10) Patent No.: US 12,439,353 B2
(45) Date of Patent: Oct. 7, 2025

(54) PHASE NOISE COMPENSATION IN A WIRELESS SYSTEM

(71) Applicant: Charter Communications Operating, LLC, St. Louis, MO (US)

(72) Inventors: Dumitru M. Ionescu, Poway, CA (US); Amitav Mukherjee, Elk Grove, CA (US); Maulik V. Vaidya, Escondido, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 701 days.

(21) Appl. No.: 17/667,011

(22) Filed: Feb. 8, 2022

(65) Prior Publication Data
US 2023/0254792 A1   Aug. 10, 2023

(51) Int. Cl.
*H04W 56/00*   (2009.01)
(52) U.S. Cl.
CPC ............................... *H04W 56/0045* (2013.01)
(58) Field of Classification Search
None
See application file for complete search history.

(56) References Cited

U.S. PATENT DOCUMENTS

| | | | | |
|---|---|---|---|---|
| 2003/0223524 A1* | 12/2003 | Mennenga | .......... | H04L 27/0014 375/371 |
| 2012/0014485 A1* | 1/2012 | Kimura | .................. | G10L 19/26 375/345 |
| 2012/0087449 A1* | 4/2012 | Ling | .................... | H04L 25/0204 375/346 |
| 2013/0114661 A1* | 5/2013 | Chiang | ............... | H04L 25/0202 375/229 |
| 2014/0023155 A1* | 1/2014 | Khoryaev | ........... | H04L 27/2695 375/349 |

(Continued)

FOREIGN PATENT DOCUMENTS

EP     0877526 A2    11/1998

OTHER PUBLICATIONS

3rd Generation Partnership Project; Technical Specification Group Radio Access Network; NR; Medium Access Control (MAC) protocol specification (Release 16), 3GPP TS 38.321 V16.0.0, Mar. 2020, pp. 1-141.

(Continued)

*Primary Examiner* — Wutchung Chu
*Assistant Examiner* — Berhanu D Belete
(74) *Attorney, Agent, or Firm* — Armis IP Law, LLC

(57) ABSTRACT

According to one configuration, a system includes a first wireless station in communication with a second wireless station. Signal processor hardware receives, from a first phase noise predictor (model), a first common phase error signal to compensate for: i) first phase noise associated with a first wireless station, and ii) second phase noise associated with a second wireless station. The signal processor hardware implements a predictive feedback compensation loop (such as including a second phase noise predictor) to produce a second (i.e., corrected) common phase error signal from the received common phase error signal. The signal processor hardware outputs the corrected common phase error signal to adjust phases of sub-carrier frequencies used to communicate data from the first wireless station to the second wireless station.

34 Claims, 17 Drawing Sheets

(56) References Cited

U.S. PATENT DOCUMENTS

| | | | |
|---|---|---|---|
| 2014/0211889 A1* | 7/2014 | Arambepola | H04L 27/265 375/350 |
| 2015/0365174 A1* | 12/2015 | Nazarathy | H04J 14/002 398/208 |
| 2017/0033918 A1* | 2/2017 | Hossain | H04L 25/4917 |
| 2018/0152284 A1* | 5/2018 | Hossain | H04L 7/0337 |
| 2018/0198667 A1* | 7/2018 | He | H04W 56/0045 |
| 2019/0052452 A1* | 2/2019 | Perlmutter | H03L 7/093 |
| 2019/0245728 A1* | 8/2019 | Li | H04L 27/2613 |
| 2020/0412390 A1* | 12/2020 | Bennett | H04B 1/0475 |
| 2021/0013889 A1* | 1/2021 | Fala | H03L 7/18 |
| 2021/0376895 A1* | 12/2021 | Xue | H04B 7/0626 |
| 2022/0094490 A1* | 3/2022 | Yang | H04W 72/542 |
| 2022/0141064 A1* | 5/2022 | Horn | H04W 72/23 370/329 |
| 2022/0311647 A1* | 9/2022 | Cheng | H04L 27/2675 |

OTHER PUBLICATIONS

Choe, Sangho, et al, "A Multi-Step Predictive CDMA Closed-Loop Power Control Scheme for Time-Varying Fading Channels", 2006 IEEE, pp. 120-123, 23rd Biennial Symposium on Communications.

Costa, Elena, et al., "M-QAM-OFDM System Performance in the Presence of a Nonlinear Amplifier and Phase Noise", IEEE Transactions on Communications, vol. 50, No. 3, Mar. 2002, pp. 462-472.

Ionescu, D. Mihai, et al., "Predictability of Uplink Channels from Downlink Channels in Frequency Division Duplex Systems: A Power Control Application", IEEE Transactions on Wireless Communications, vol. 3, No. 5, Sep. 2004, pp. 1781-1788.

Ionescu, D. Mihai, et al., "Predictive Closed-Loop Power Control for Frequency-Division Duplex Wireless Systems", IEEE Communications Letters, vol. 5, No. 6, Jun. 2001, pp. 248-250.

Robertson, Patrick, et al., "Analysis of the Effects of Phase-Noise in Orthogonal Frequency Division Multiplex (OFDM) Systems", 1995 IEEE, pp. 1652-1657, Oxford University Libraries: Downloaded on Mar. 31, 2010.

Schniter, Philip, "Low-Complexity Equalization of OFDM in Doubly Selective Channels", IEEE Transactions of Signal Processing, vol. 52, No. 4., Apr. 2004, pp. 1002-1011.

International Search Report, PCT/US2023/012109, May 12, 2023, pp. 1-12.

Liu G. et al., "Compensation of Phase Noise in OFDM Systems Using an ICI Reduction Scheme", IEEE Transactions on Broadcasting, IEEE Service Center, Piscataway, NJ, US, vol. 50, No. 4, Dec. 6, 2004 (Dec. 6, 2004), pp. 399-407, XP011123072.

3GPP TSG RAN WG4 Meeting #95-e, R4-2009245, "Reply LS to RAN2 on dormant BWP", Release 16, May 25-Jun. 5, 2020, pp. 1.

5G; "NR; NR and NG-RAN Overall Description; Stage 2," 3GPP TS 38.300 version 16.2.0 Release 16, ETSI TS 138 300 V16.2.0 (Jul. 2020) pp. 1-150.

5G; NR: "Radio Resource Control (RRC)" Protocol specification, (3GPP TS 38.331 version 16.1.0 Release 16), ETSI TS 138 331 V16.1.0 (Jul. 2020), pp. 1-886.

Bello, Philip A., "Characterization of Randomly Time-Variant Linear Channels," IEEE Transactions on Communications Systems, vol. 11, No. 4, Dec. 1963, pp. 360-393.

CMCC, Revised WID: Extending current NR operation to 71 GHz, 3GPP TSG RAN Meeting #90-e, RP-202925, Electronic Meeting, Dec. 7-11, 2020, pp. 1-6.

Garcia, Ana Armada, Understanding the Effects of Phase Noise in Orthogonal Frequency Division Multiplexing (OFDM), IEEE Transactions on Broadcasting, vol. 47, No. 2, Jun. 2001, pp. 1-7.

Intel Corporation, Revised SID: Study on supporting NR from 52.6 GHz to 71 Ghz, 3GPP TSG RAN Meeting #88e, RP-200902, Electronic Meeting, Jun. 29-Jul. 3, 2020 (revision of RP-193259), pp. 1-3.

Schenk, et al., "Analysis of the Influence of Phase Noise in MIMO OFDM based WLAN systems", in Proceedings Symposium IEEE Benelux Chapter on Communications and Vehicular Technology, (SCVT2003), Nov. 2003, pp. 1-8.

Schenk, et al., "On the Influence of Phase Noise Induced ICI in MIMO OFDM Systems", IEEE Communications Letters, vol. 9, No. 8, Aug. 2005, pp. 682-684.

Stamoulis, et al., "Intercarrier interference in MIMO OFDM," IEEE Transactions on Signal Processing, vol. 50, No. 10, Oct. 2002; pp. 2451-2464.

Petrovic, et al., "Effects of Phase Noise on OFDM Systems With and Without PLL: Characterization and Compensation", IEEE Transactions on Communications, vol. 55, No. 8, Aug. 2007, pp. 1607-1616.

Demir, et al, Phase Noise in Oscillatiors: A Unifying Theory and Numerical Methods for Characterization: IEEE Transactions on Circuits and Systems—I: Fundamental Theory and Applications, vol. 47, No. 5 May 2000, pp. 655-673.

* cited by examiner

PHASE NOISE COMPENSATION IN A WIRELESS SYSTEM

BACKGROUND

So-called Phase Noise (PN) is a common source of error in wireless systems operating at high carrier frequencies such as in millimeter-wave spectrum. In general, phase noise occurs due to imperfections at respective local oscillators at in a transmitter and a receiver. In a MIMO OFDM (Multiple Input Multiple Output Orthogonal Frequency Division Multiplexing) system (for e.g., 5G New Radio), paging notification causes both a common phase error (CPE) (multiplicative factor) on the OFDM subcarriers, as well as inter-carrier interference (ICI) (additive component) among the subcarriers. Phase noise effects are exacerbated as a magnitude of the wireless carrier frequency increases.

A Rel-17 Study Item on extending NR (New Radio) operation to the frequency range 52.6 GHz-71 GHz has been in progress. This feature targets utilization of the very wide unlicensed and licensed spectrum bandwidths in this frequency range.

New OFDM numerologies, such as a subcarrier spacing of 960 kHz and 480 kHz, have been introduced for this frequency range in order to increase robustness against phase noise.

In NR, phase tracking reference signals (PT-RS or so-called Phase Tracking Reference Signals) have been introduced to facilitate phase noise estimation and compensation at a wireless receiver. Both DL (DownLink) and UL (UpLink) PT-RS transmissions can be configured to provide phase noise estimation.

In one conventional application, on the DL, PT-RS signals are allocated within the time-frequency resources used for PDSCH (Physical Downlink Shared Channel). On the UL, PT-RS signals are allocated within the time-frequency resources used for PUSCH (Physical Uplink Shared Channel). The time-domain and frequency-domain density of the PT-RS is set to either a default value or configured by higher layers. PT-RS signals are designed to not overlap or collide with demodulation reference signals (DM-RS).

Phase noise in a MIMO-OFDM system with $N_t$ transmit antennas, $N_r$ receive antennas, and K subcarriers can be modeled as:

$$y = (G_r \otimes I_r) H (G_t \otimes I_t) x + w$$

where $y \subset C^{KN_r \times 1}$ is the received complex frequency-domain signal, the K×K matrices $G_r$ and $G_t$ represent Rx-side and Tx-side phase noise, $\otimes$ is the Kronecker product operator, $I_r$ and $I_t$ are $N_r \times N_r$ and $N_t \times N_t$ identity matrices, $H \subset C^{KN_r \times KN_t}$ is a block-diagonal matrix representing the overall fading channel coefficients, $X \subset C^{KN_t \times 1}$ is the transmitted signal vector, and $w \subset C^{KN_r \times 1}$ is additive complex Gaussian noise.

Element (k,l) of $G_t$ with guard interval g and random phase θ can be written as $$g(k-l) = \frac{1}{K} \sum_{i=0}^{K-1} \exp(j\theta_{t,g} + i + 1) \exp\left(-j \frac{2\pi i (k-l)}{K}\right)$$

BRIEF DESCRIPTION OF EMBODIMENTS

There are deficiencies associated with conventional techniques of providing wireless connectivity. For example, phase noise compensation (especially on the receiver-side of a wireless station pair) is a complex procedure that requires estimation of phase noise from reference signals. In contrast to conventional techniques, embodiments herein propose several ways of providing novel phase noise pre-compensation at one or more wireless stations in a network environment. The phase noise pre-compensation as discussed herein can be implemented in any suitable frequency range. In one nonlimiting example embodiment, the phase noise compensation is implemented in a frequency range of 52 to 71 GHz.

More specifically, a system includes signal processor hardware. The signal processor hardware receives a first common phase error signal to problem compensation for: i) first phase noise associated with a first wireless station, and/or ii) second phase noise associated with a second wireless station. The signal processor hardware implements a predictive feedback compensation loop to produce a second common phase error signal. In one embodiment, the second common phase error signal generated by the predictive feedback compensation loop is a corrected common phase error signal derived from the received common phase error signal. The signal processor hardware further utilizes the corrected common phase error signal to adjust phases of wireless signals communicated from the first wireless station to the second wireless station.

In still further example embodiments, the predictive feedback compensation loop is operative to iteratively produce samples of the second common phase error signal based on samples of the first common phase error signal. In one embodiment, a time duration between each of the samples of the corrected common phase error signal is equal to a time duration of a symbol transmitted from the second wireless station to the first wireless station.

In yet further example embodiments, the corrected common phase error signal produced by the predictive feedback compensation loop is a future prediction of the received common phase error signal.

Further embodiments herein include the signal processor hardware receiving the first common phase error signal from a first auto-regressive predictor. Via a second auto-regressive predictor disposed in the predictive feedback compensation loop, the signal processor hardware produces a feedback signal in the predictive feedback compensation loop based on a received delay value associated with the first auto-regressive predictor. In one embodiment, the received delay value indicates a delay between the first auto-regressive predictor processing wireless uplink reference signals received from the second wireless station and producing the first common phase error signal. In another example embodiment, the received delay value represents a delay between the corrected common phase error signal and the received common phase error signal.

In yet further embodiments, via the predictive feedback compensation loop, the signal processor hardware generates the second common phase error signal based at least in part on a delay associated with the received first common phase error signal. Based on the second common phase error signal, the signal processor hardware adjusts phases of multiple sub-carrier frequencies used to convey data over the wireless signals communicated from the first wireless station to the second wireless station.

As previously discussed, the second common phase error signal can be used to provide phase adjustments. In one embodiment, the second common phase error signal provides phase noise compensation for both the first phase noise which is associated with a first local oscillator in the first wireless station and the second phase noise which is associated with a second local oscillator in the second wireless station.

The predictive feedback compensation loop can be configured to include any suitable components to generate the corrected common phase error signal (i.e., the second common phase error signal). For example, in one embodiment, the predictive feedback compensation loop includes an integrator to produce samples of the corrected common phase error signal.

The first common phase error signal can be received from any suitable resource. In one embodiment, the signal processor hardware receives the first common phase error signal from a first auto-regressive predictor (such as part of or separate from the signal processor hardware). The first auto-regressive predictor produces the first common phase error signal based on a first set of coefficients derived from monitoring wireless uplink communications from the second wireless station to the first wireless station. The signal processor hardware produces the second common phase error signal based on a second auto-regressive predictor disposed in the predictive feedback compensation loop. For example, in one embodiment, the second auto-regressive predictor derives the second common phase error signal based at least in part on a second set of coefficients derived from monitoring the wireless uplink communications from the second wireless station to the first wireless station.

Embodiments herein are useful over conventional techniques. For example, implementation of phase noise adjustment correction at a single wireless station such as implementing the signal processor hardware, instead of processing at multiple wireless stations, reduces or eliminates a need for complex phase noise circuitry in either one or both the first wireless station and the second wireless station. In one embodiment, a first wireless station includes circuitry (such as including signal processing hardware and/or communication management hardware) to determine a combination of phase noise associated with the first wireless station and a second wireless station. The first wireless station implements phase noise estimation and compensation, mitigating phase noise associated with both the first wireless station and the second wireless station.

Alternatively, the second wireless station communicates detected phase noise information to the first wireless station that implements phase noise compensation.

Yet further, the first wireless station can be configured to implement phase noise compensation based on first phase noise information generated by the first wireless station and second phase noise information generated by the second wireless station.

Note that any of the resources as discussed herein can include one or more computerized devices, wireless stations, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein. Accordingly, embodiments herein are directed to a method, system, computer program product, etc., that supports operations as discussed herein.

One embodiment includes a computer readable storage medium and/or system having instructions stored thereon to facilitate phase noise (pre) compensation (adjustment). The instructions, when executed by computer processor hardware, cause the computer processor hardware (such as one or more co-located or disparately processor devices) to: receive a first common phase error signal to compensate for: i) first phase noise associated with a first wireless station, and ii) second phase noise associated with a second wireless station; implement a predictive feedback compensation loop to produce a second common phase error signal, the second common phase error signal being a corrected common phase error signal derived from the received common phase error signal; and utilize the corrected common phase error signal to adjust phases of wireless signals communicated from the first wireless station to the second wireless station.

The ordering of the steps above has been added for clarity sake. Note that any of the processing steps as discussed herein can be performed in any suitable order. Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of wireless technology supporting wireless communications. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
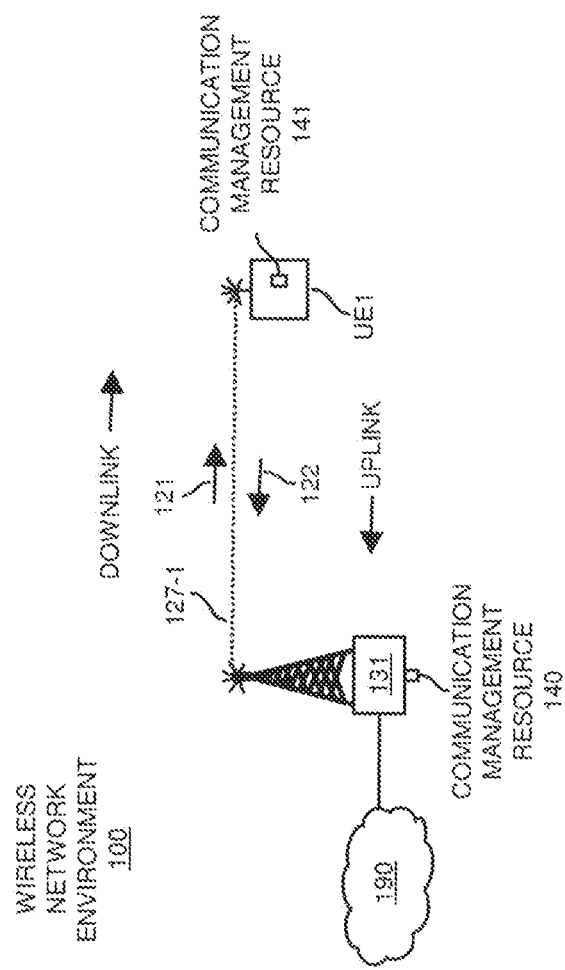
FIG. 1 is an example diagram illustrating a wireless network environment and implementation of phase noise compensation according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to embodiments herein, a system includes a first wireless station in communication with a second wireless station. Signal processor hardware such as disposed in a first wireless station receives, from a first phase noise predictor (model), a first common phase error signal to compensate for: i) first phase noise associated with a first wireless station, and ii) second phase noise associated with a second wireless station. The signal processor hardware implements a predictive feedback compensation loop (such as including a second phase noise predictor) to produce a second (i.e., corrected) common phase error signal from the received common phase error signal. The signal processor hardware outputs the corrected common phase error signal to adjust phases of sub-carrier frequencies used to communicate data from the first wireless station to the second wireless station.

Receiver-side phase noise (PN) estimation, compensation and removal is a complex, power-consuming procedure requiring receiver-side estimation of phase noise statistics from downlink (DL) reference signals, followed by receiver-side removal of at least the Common Phase Error (CPE)—and optionally by filtering for removing inter-carrier interference (ICI), or in abbreviated form 'de-ICI' processing.

Embodiments herein include methods and/or apparatus for (i) remote pre-compensation of PN manifested at receiver-side—i.e., CPE pre-compensation is enacted at opposite end of the link (transmitter-side)—while, further (ii) implementing a negative feedback mechanism aimed both at (ii.1) reducing the variance of closed-loop (CL) error (i.e., alleviating the prediction error; cf. standalone diagram below) and at (ii.2) compensating for some delay, related, for example, to predictor implementation.

In one embodiment, a system as discussed herein compensates for the phase noise at the remote end of the link (such as at a base station, which has more computational resources and energy resources than a battery-operated user equipment). The system can be configured to employ a closed-loop operation to further reduce the prediction errors incurred in primary prediction of a common phase error signal, as well as compensating for a delay that can occur due to implementation delays for computing and using the predicted values.

In one embodiment, the phase noise compensation performance is driven by the variance of the closed-loop error at the output of a closed-loop comparator—in turn, reduced by operations of the predictive feedback compensation loop as discussed herein.

Particular merits exist when a 5G NR (New Radio) operates in millimeter-wave frequency range (i.e., with high sub-carrier spacing (SCS); 52.6-71 GHz as exemplary scenario); here not only is the phase noise more pronounced, but the larger Sub-Carrier Spacing (SCS) reduces the duration of the OFDM (Orthogonal Frequency Division Multiplexing) symbol in time, and constrains the time available to implement and propagate each phase noise prediction value.

The closed-loop idea as disclosed herein (such as predictive feedback compensation loop in combination with prediction) is significantly different from any conventional implementation where a (remote) predictor is freely—running (in some semi-open-loop manner)—until it can be (more or less periodically) refreshed.

Moreover, this disclosure includes the observation that implementation of the system as described herein causes raw prediction errors to be actively reduced by the closed-loop action (via negative feedback) of respective signal processing hardware—even in the presence of some delay in obtaining a CPE estimate value (or prediction).

Further, embodiments herein fully lend themselves to implementation via Lyapunov analysis (of the reduced, closed-loop error variance in converged state).

Still further, the current disclosure denotes and selects a prediction order that depends, in principle, on some prediction delay (see above; said delay is to be compensated by the closed-loop operation of prediction) certain embodiments implement a nonlinear stochastic difference equation with prediction-in-the-loop, meant to zero-out, on average, the error at the closed-loop comparator's output.

If desired, the delay as described herein can be, for example, an implementation delay in processing a CPE estimate, expressed in magnitude via one or more time durations of transmitting OFDM symbols.

As previously discussed, the base station (BS) implements either, or both, the prediction and/or the predictor state update in a closed-loop form, across (preferably successive) OFDM symbols. The user equipment (such as a mobile communication device he communication with the wireless base station) may, in some embodiments, send CPE estimates to the wireless base station (such as over a physical uplink control channel) to mitigate particular circumstances.

The user equipment may, in some embodiments, send the auto-regressive (AR) coefficients—so-called predictor coefficients—that it may choose to derive during initial random access or opportunistically (i.e., according to a reduced duty cycle) at opportunistic (favorable) times during a TDD pattern.

Still further, embodiments herein include implementation in the frequency-domain, but may be implemented in the time-domain as well.

Now, more specifically, FIG. 1 is an example diagram illustrating a wireless network environment and implementation of compensation according to embodiments herein.

In this example embodiment, the wireless network environment 100 includes wireless base station 131 (a first wireless station) and one or more instances of mobile devices (such as wireless stations UE1, UE2, etc.).

During operation, the user equipment UE1 establishes a respective wireless link 127-1 with the wireless base station 131. Via the wireless communication link 127-1, the wireless base station 131 provides the user equipment UE1 access to network 190 (such as the Internet, cellular network, etc.).

In an uplink (a.k.a., upstream) direction, the wireless communication link 127-1 supports communications 122 from the user equipment UE1 through the wireless base station 131 to the network 190. In a downlink (a.k.a., downstream) direction, the wireless communication link 127-1 supports communications 121 from the network 190 through the wireless base station 131 to the user equipment UE1.

In further example embodiments, the wireless base station 131 includes a communication management resource 140 to support, among other things, phase noise compensation as discussed herein. Depending on the embodiment, user equipment UE1 includes communication management resource 141 supporting phase noise compensation as discussed herein. Additional details of the phase noise compensation are further discussed below.

Note that one embodiment includes implementation of phase noise pre-compensation in the case when the transmitter-side (such as wireless base station 131) phase noise profile is known with high accuracy to the transmitter (e.g., base station), and the transmitter-side estimate of the receiver-side PN is imperfect.

In one embodiment, so-called UE-side (such as user equipment UE1) phase noise statistics (a.k.a., phase noise information) are obtained at the base station 131 using one or both of the following methods: i) via the communication management resource 141, implementing phase noise estimation at the UE1 via generation of phase noise information, which is communicated (fed back) over the wireless communication link 127-1 to the base station 131 on an uplink such as via one or more uplink control information messages (e.g., PUCCH, etc.); and/or ii) phase noise estimation and generation of phase noise information at the communication management resource 140 of the wireless base station 131 based on uplink communications (such as repeated PT-RS transmissions or other wireless reference signals) from the user equipment, the reference signals capture the effect of UE transmit phase noise, and assuming that UE transmit phase noise on the uplink is statistically correlated with UE1 phase noise associated with receiving data on the downlink from the wireless station 131.

In further example embodiments, the transmitter-side phase noise characteristics are estimated based on knowledge of the corresponding local oscillator architecture and characteristics.

As further discussed herein, note further that, based on the knowledge of UE-side phase noise information, the base station 131 can be configured to select an appropriate time-frequency density configuration associated with communication of the wireless reference signals such as PT-RS communicated on the downlink to the user equipment UE1. In other words, one or more of the wireless base station 131 and corresponding communication management resource 140 can be configured to: i) control a density of communicating wireless reference (pilot) signals in a downlink to the user equipment UE1 depending on use by the user equipment UE1 to generate phase noise information; ii) a density of communicating wireless reference (pilot) signals in an uplink to the wireless station 131 depending on system needs, and so on.

Figure 2:
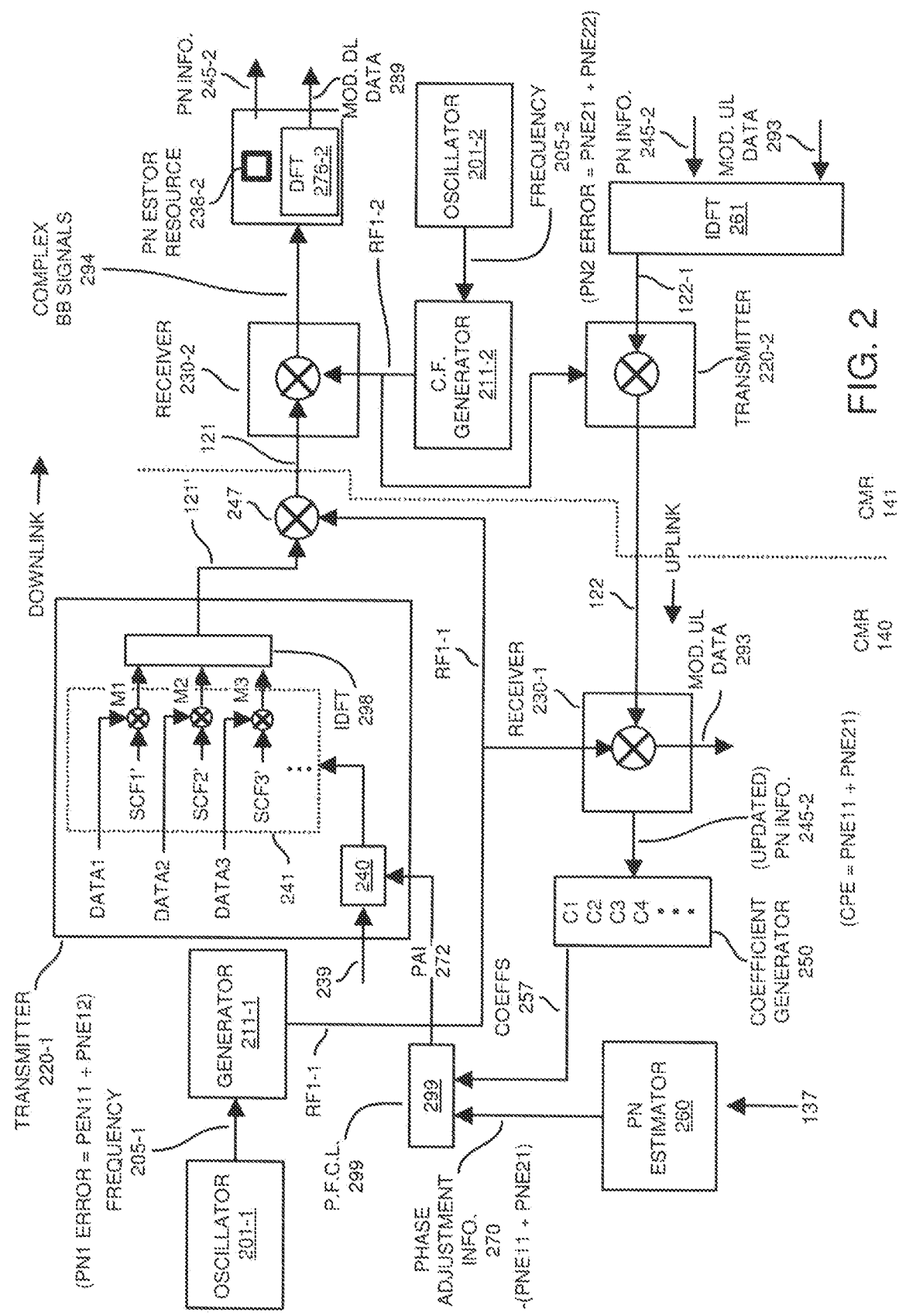
FIG. 2 is an example block diagram illustrating components of a wireless system and implementation of phase noise estimation and compensation in a wireless station according to embodiments herein.

FIG. 2 is an example block diagram illustrating components of a wireless system and implementation of a phase noise estimator in a wireless station such as user equipment according to embodiments herein.

As shown in this example embodiment, the communication management resource 140 includes multiple resources.

Note that any of the resources as discussed herein can be implemented via hardware, software, or a combination of hardware and software.

For example, the communication management resource 140 (a.k.a., signal processor resource) can be implemented via communication management hardware, communication management software, or a combination of communication management hardware and communication management software; the communication management resource 141 can be implemented via communication management hardware, communication management software, or a combination of communication management hardware and communication management software; phase noise estimator 260 can be implemented as phase noise estimator hardware, phase noise estimator software, and phase noise estimator hardware and phase noise estimator software; phase adjustor 240 can be implemented as phase adjustor hardware, phase adjustor software, or a combination of phase adjustor hardware and phase adjustor software; phase noise estimator resource 238-1 or 238-2 can be implemented as phase noise estimator hardware, phase noise estimator software, or a combination of phase noise estimator hardware and phase noise estimator software; and so on.

In this example embodiment, the communication management resource 140 associated with the wireless station 131 includes oscillator 201-1, generator 211-1, transmitter 220-1, receiver 230-1, coefficient generator 250, and phase noise estimator 260. Transmitter 220-1 in this example embodiment includes phase (noise) adjustor 240.

The communication management resource 141 associated with the user equipment UE1 includes oscillator 201-2, generator 211-2, receiver 230-2, transmitter 220-2, and phase noise estimator resource 238-2.

In this example embodiment, the oscillator 201-1 (such as main clock associated with wireless station 131) produces a frequency signal 205-1 supplied to the frequency generator 211-1. The frequency signal 205-1 is susceptible to phase noise error, resulting in phase noise error including phase noise error PNE11 (such as common phase noise error) and PNE12 (such as non-correctable phase noise error).

The oscillator 201-2 produces a frequency signal 205-2 supplied to the frequency generator 211-2. The frequency signal 205-2 is susceptible to phase noise, resulting in phase noise error including phase noise error PNE21 (such as correctable phase noise error) and PNE22 (such as non-correctable phase noise error).

Embodiments herein include providing phase noise compensation (such as correction) for the generally correctable phase noise error PNE11 and phase noise error PNE21 as further discussed herein.

More specifically, in this example embodiment, the phase adjustor 240 receives sub-carrier frequency signals 239 (such as sub-carrier frequency SCF1, sub-carrier frequency SCF2, sub-carrier frequency SCF3, . . . ) in the base-band supplied to the transmitter 220-1. The sub-carrier frequencies in the base-band include phase noise error.

As further shown, the phase adjustor 240 also receives phase adjustment information 272 (negative of the detected common phase error PNE11 and PNE21) from, the predictive feedback compensation loop 299. As its name suggests, the phase adjustment information 272 received from the predictive feedback compensation loop 299 adjusts (compensates) one or more signals associated with the wireless station 131.

Figure 8:
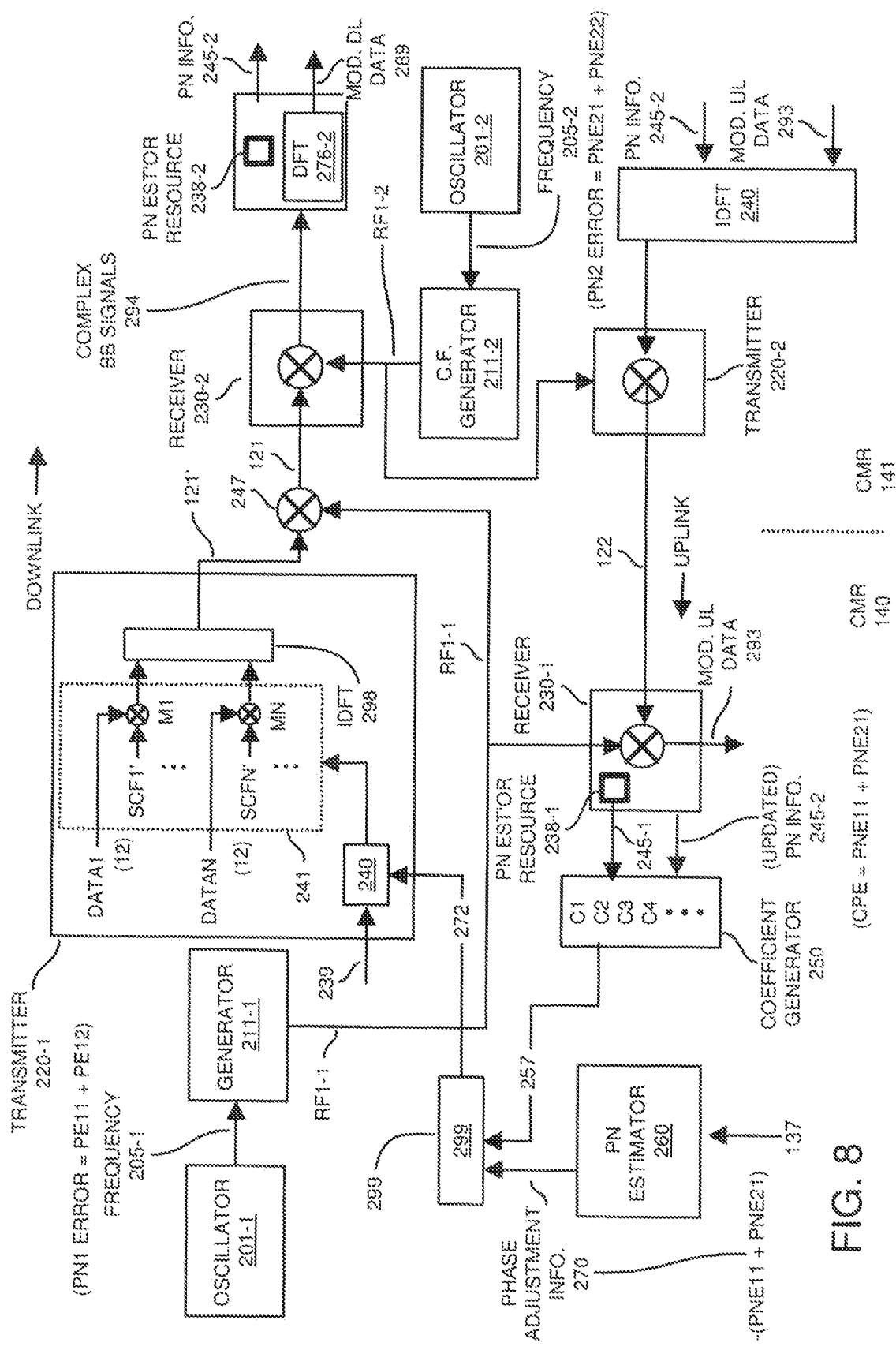
FIG. 8 is an example block diagram illustrating components of a wireless system and implementation of a first phase noise estimator in a first wireless station and a second phase noise estimator in a second wireless station according to embodiments herein.

For example, in one embodiment, the phase adjustor 240 applies the phase adjustment information 272 (compensation information) to each of the sub-carrier frequencies 239 to produce phase noise compensated sub-carrier frequencies SCF1', SCF2', SCF3', . . . . An example is shown in FIG. 8.

Referring again to FIG. 2, transmitter 220-1 uses the phase noise compensated sub-carrier frequency signals SCF1', SCF2, SCF3', etc., outputted from the phase adjustor 240 to produce one or more wireless signals communicated to the IDFT (Inverse Discrete Fourier Transform) function 298. For example, the signal processor 241 receiving the phase noise compensated sub-carrier frequencies includes a first multiplier M1 that modulates the sub-carrier frequency SCF1' via data DATA1 to produce a sequence of symbols pre-compensated via the phase noise compensated sub-carrier frequency SCF1'; the signal processor 241 includes a second multiplier M2 that modulates the sub-carrier frequency SCF2' via data DATA2 to produce a sequence of symbols modulated via the sub-carrier frequency SCF2'; the signal processor 241 includes a third multiplier M3 that modulates the sub-carrier frequency SCF3' via data DATA3 to produce a sequence of symbols modulated via the sub-carrier frequency SCF3'; and so on.

As further discussed herein, the communication management resource 140 of the wireless station 131 can be allocated any number of sub-carrier frequencies (such as 15 KHz bandwidth×12 sub-carrier frequencies per physical resource block) to support communications in corresponding resource elements of one or more resource blocks. The signal processor 241 can include any number of multipliers to modulate respective data (as symbols) onto signals communicated to the user equipment UE1.

In further example embodiments, the IDFT 298 receives the modulated signals produced and outputted by the multipliers M1, M2, etc., and produces corresponding signal 121' (time domain signal) encoded with the phase noise compensated signals received from multipliers.

As an alternative to providing phase noise compensation in the frequency domain via signal processor 241, note that embodiments herein include applying phase noise compensation in the time domain via compensation of signal 121'.

As further shown, multiplier 247 receives signal 121' and carrier frequency RF1-1 (such as between 50-80 GHz or other suitable frequency value) produced by the generator 211-1. Multiplier 247 outputs wireless communications 121 (such as wireless signals encoded or modulated with respective data) from the wireless station 131 over communication link 127-1 in the downlink direction to the communication management resource 141 associated with user equipment UE11.

In one embodiment, the phase adjustor 240 uses the phase adjustment information 272 as a basis to provide phase noise compensation (reducing phase noise error) to the one or more sub-carrier frequencies 239 or signals generated by the transmitter 220-1. Based on application of the phase adjustment information, the phase adjustor 240 eliminates at least a portion (i.e., the CPE component or common phase error component) of phase noise associated with the sub-carrier frequencies 239.

As previously discussed, the transmitter 220-1 uses data signals DATA1, DATA2, etc., (or pilot signals) to modulate the respective sub-carrier frequencies supporting communications 121 over the wireless communication link 127-1 to the user equipment UE 1.

At the user equipment UE1 side, the generator 211-2 uses the frequency signal 205-2 as a basis to produce carrier frequency RF1-2 (substantially same RF carrier frequency as RF1-1) supplied to the receiver 230-2. The receiver 230-2 demodulates the received communications 121 to produce complex base-band signals 294 (such as including encoded DATA1, DATA2, etc.) communicated from the wireless station 131 to the user equipment UE1. Via the base-band signals 294, the DFT (Discrete Fourier Transform) function 276-2 produces modulated downlink data 289 for further processing and retrieval of corresponding data DATA1, DATA2, etc.

As further discussed herein, in addition to communicating data, the transmitter 220-1 repeatedly transmits multiple reference signals such as PT-RS (Phase Tracking Reference Signal) signals, DM-RS (Demodulation Reference) signals, etc., via one or more sub-carrier frequencies in one or more different time slots of allocated resource blocks. As further discussed herein, the reference signals can be spread across time (multiple time slots or resource elements) and/or spread across frequency domains (channels) to the user equipment UE1.

In this example embodiment, the phase noise estimator resource 238-2 monitors the received wireless reference signals (pilot signals such as PT-RS signals, DM-RS signals, etc.) present in wireless signal 121' from the transmitter 220-1 and produces phase noise information 245-2 associated with receipt of the reference signals in communications 121. Note that details of such reference signals (communicated in the downlink over sub-carrier frequencies of wireless signal 121) used to produce the phase noise information 245-2 is further discussed below in FIGS. 11-15.

Referring again to FIG. 2, in further example embodiments, as previously discussed, the generator 211-2 uses the frequency signal 205-2 as a basis to produce one or more carrier frequency signals such as RF1-2. Transmitter 220-2 uses the carrier frequency RF1-2 as a basis in which to communicate phase noise information 245-2, uplink information, reference signals, etc., to the wireless station 131 (via communications 122 including the generated phase noise information 245-2) transmitted over the uplink of the wireless communication link 127-1 to the communication management resource 140 of wireless station 131 for processing. For example, the IFDT 261 receives phase noise information 245-2 and modulated uplink data 293 and produces signal 122'. Transmitter 220-2 uses the signal 122' to modulate the carrier frequency RF1-2 and communicate phase noise information 245-2, uplink information, reference signals, etc., to the wireless station 131 via wireless signal 122.

The receiver 230-1 demodulates the received communications 122 with the carrier frequency RF1-1 (same frequency as RF1-2) to obtain the phase noise information 245-2 generated by the phase noise estimator resource 238-2 and transmitted from the user equipment UE1. In one embodiment, as previously discussed, such phase noise information 245-2 captures information about the total phase noise error (a.k.a., common phase error PNE11+PNE21) associated with the oscillators 201-1 and 201-2.

In further example embodiments, the phase noise information 245-2 such as received on the uplink over wireless communication link 127-1 is stored in registers of the coefficient generator 250. The phase noise estimator 260 analyzes the symbols (received over uplink 122) in signal 137 for pilot signals received on one or more sub-carrier frequencies. Based on the analysis of pilot signals, the phase noise estimator 260 produces the phase adjustment information 270 (a.k.a., common phase error signal indicating an estimate of aggregate phase noise associated with the wireless base station 131 and user equipment UE1). In one embodiment, the phase adjustment information or common phase error is a new or latest estimate of a common phase error associated with analysis of a newly received symbol in signal 137 received output on the uplink.

Additionally, in one embodiment, the coefficient generator 250 generates the coefficients 257 based on the updated processing node information 245-2. Via the phase noise information 245-2, the coefficient generator 250 generates and supplies corresponding phase noise coefficients 257 to the predictor model (such as linear auto-regressive predictor) disposed in the predictive feedback compensation loop 299. As further discussed herein, a predictor model (320) of the predictive feedback compensation loop 299 uses the phase adjustment information 270 and the coefficients 257 to produce the phase adjustment information 272 (a.k.a., corrected common phase error signal) supplied to the phase adjustor 240.

In one embodiment, as its name suggests, the phase adjustment information 270 includes one or more phase adjustment settings (such as the detected phase noise error PNE11+PNE21) supplied to the predictive feedback compensation loop 299. The predictive feedback compensation loop 299 uses coefficients 257 to provide improved, more accurate phase adjustment information 272 (corrected common phase error) based on the phase adjustment information 270 and the coefficients 257 in a manner as further discussed herein.

To provide phase noise pre-compensation at the wireless station 131, the phase adjustor 240 provides signal adjustments or compensation to remove respective phase noise error (common phase error such as PNE11+PNE21) from the signals 121' and subsequent communications 121 transmitted by the transmitter 220-1 of the wireless station 131 to the user equipment UE1.

As further discussed below, embodiments herein include one or more of providing phase noise adjustments (compensation) via phase adjustor 240 in the frequency domain. Alternatively, note that the phase noise compensation can be achieved in a time domain (such as via modification of signal 121') rather than in the frequency domain via signal processor 241.

Thus, in one embodiment, the communication management resource 140 (such as a phase noise management resource or signal processor hardware) associated with or in the first wireless station 131 receives phase noise information 245-2 generated by the user equipment UE1. The received phase noise information 245-2 provides an estimate of a combination of common phase error associated with: i) first phase noise (PNE11) associated with the oscillator 201-1 of the wireless station 131, and ii) second phase noise (PNE21) associated with the local oscillator of the user equipment UE1. In this example embodiment, as previously discussed, the phase noise information 245-2 is generated by the phase noise estimator resource 238-2.

Based on the received phase noise information 245-2, the communication management resource 140 produces phase noise adjustment information 270 (phase noise compensation information or a.k.a. an estimate of the common phase error). The predictive feedback compensation loop 299 provides further predictive adjustments to the received phase adjustment information 270 to produce the phase adjustment information 272. Via the phase noise adjustment information 272 (such as a corrected estimate of common phase error associated with oscillators 201-1 and 201-2), the communication management resource 140 adjusts one or more signals (such as signals 239) associated with the wireless station 131 via phase adjustor 240.

As previously discussed, adjustment of the one or more signals (such as adjustment of one or more sub-carrier frequencies) results in phase noise adjustment to both a first portion of phase noise (such as phase noise PE11) associated with the first wireless station 131 and a portion of second phase noise (such as phase noise PE21) associated with the second wireless station UE1.

Note further that, in one embodiment, during a condition when the multipath channel does not change during an OFDM (Orthogonal Frequency Division Multiplexing) symbol, the following opportunities exist. For example, embodiments herein include a method that exploits correlation between CPE (common phase error) in adjacent OFDM symbols. As SCS increases (i.e., OFDM symbol duration decreases) the correlation of the common phase error (CPE) increases among adjacent OFDM symbols. Once a CPE (a.k.a., common phase error) estimate (such as estimate of PNE11 and PNE21) is obtained via phase noise information 245-2, it is fed forward to a few upcoming OFDM symbols.

In further example embodiments, a receiver side predictive method (such as implemented by the phase noise estimator resource 238-2 exploits correlation between CPE (Common Phase Error) in adjacent OFDM symbols. Prediction can be employed, as a refinement of the above, with the state of the predictor re-actualized every few OFDM symbols.

Further embodiments herein include a base station side predictive method that exploits correlation between CPE in adjacent OFDM symbols. For example, in one embodiment, the mobile communication device UE1 can be configured to send CPE estimates to the wireless base station 131 via wireless communications such as PUCCH (Physical Uplink Control Channel) communications or other suitable channel (s). The base station 131 implements the prediction and the predictor state update. The base station 131 optionally applies CPE correction pre-receiver-FFT in the symbols that carry data, but not on symbols that carry reference signals, e.g. CSI-RS.

An example is a simple autoregressive predictor of the form:

$$G(t+1)=\Sigma_{n=1}^{N} a_n G(t-n)+e(t)$$

where the predictor is for either the receiver-side PN or the equivalent end-to-end PN, and the N filter coefficients an are the optimization parameters, and e(t) is residual white noise.

Figure 3:
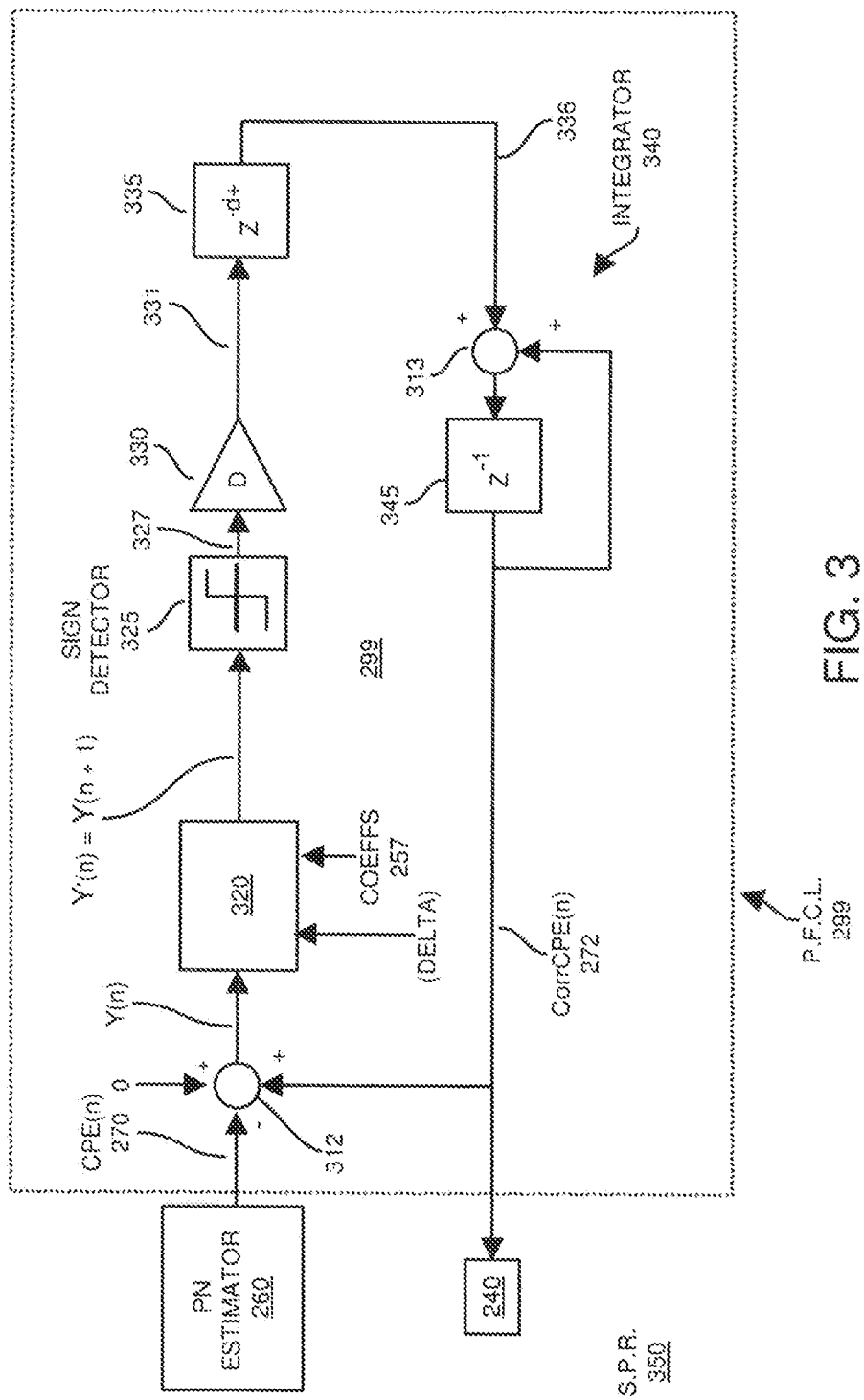
FIG. 3 is an example diagram illustrating a predictive feedback compensation loop according to embodiments herein.

FIG. 3 is an example diagram illustrating a predictive feedback compensation loop according to embodiments herein.

In this example embodiment, the signal processor resource 350 associated with the wireless station 131 and communication management resource 140 includes a predictive feedback compensation loop 299. In one embodiment, the predictive feedback compensation loop 299 includes summer 312, a phase noise predictor model 320, sign detector 325, amplifier 330, delay function 335, and integrator 340.

Integrator function 340 includes summer 313 and delay function 345.

Note that the signal processor resource 350 can be configured as signal processor hardware, signal processor software, or a combination of signal processor hardware and signal processor software.

As previously discussed, the predictive feedback compensation loop 299 receives the phase adjustment information 270 (a.k.a., a first common phase error signal such as CPEn representing a first guess or sample as to the common phase error or phase noise error associated with the wireless stations) from the phase noise estimator 260. As previously discussed, the phase noise estimator 260 analyzes the symbols in signal 137 (one or more sub-carrier frequencies received over uplink 122) for pilot signals. Based on timing analysis of pilot signals in the symbols, the phase noise estimator 260 produces the phase adjustment information 270 (a.k.a., common phase error signal indicating an estimate of aggregate phase noise associated with the wireless base station 131 and user equipment UE1).

Additionally, as previously discussed, in one embodiment, the phase noise estimator 260 is configured in any suitable manner to produce the phase adjustment information 270 based on prior processing of wireless signals received in the uplink from the wireless station UE1 over the wireless communication link. Because the phase noise estimator 260 operates on a currently or previously received symbol, the output of the phase noise estimator 260 can be delayed such as by a time duration DELTA (such as a time duration of the phase noise estimator 260 processing one or more received symbols).

In one embodiment, a time duration between each of the samples of the corrected common phase error signal is equal to a time duration (DELTA) of a symbol (in signal 137) transmitted from the wireless station UE1 to the wireless station 131. The received delay value DELTA represents a delay between the corrected common phase error signal CorrCPEn (phase adjustment information 272) and the received common phase error signal CPEn (phase adjustment information 270).

In further example embodiments, depending on a processing speed of the phase noise estimator 260, the phase adjustment information 270 (such as a first common phase noise error signal CPEn) associated with a currently processed one or more symbols can be delayed with respect to actual error by a time delay value DELTA such as 1X, 2X, 3X, 4X, 5X, etc., where X represents a duration of time transmitting a single wireless symbol in the uplink or downlink.

Because the current sample of the common phase error signal CPEn (phase adjustment information 270) as provided by the phase noise estimator 260 is delayed with respect to the actual phase noise, the phase adjustment information 270 (common phase error signal CPEn) is not necessarily the best prediction of the current common phase noise error to be applied to the signals 239. To provide more accurate common phase error adjustments and thus correct the received common phase error signal CPEn (phase adjustment information 270), embodiments herein include implementing the predictive feedback compensation loop 299 to predict the actual common phase error (such as corrected common phase error signal CorrCPEn) for the current operational time. As further discussed herein, the predictive feedback compensation loop 299 includes phase noise predictor model 320, which is supplemental with respect to the phase noise estimator 620 producing the common phase error CPEn.

More specifically, in this example embodiment, the summer 312 receives a sample value of the common phase error signal CPEn (phase adjustment information 270) for sample time n. Given that the phase adjustment information 270 is CPE(n), the summer 312 produces the signal Y(n) =CorrCPEn−CPEn, where CorrCPEn (phase adjustment information 272) represents the corrected common phase error signal. As discussed herein, the corrected common phase error signal (phase adjustment information 272) provides a more accurate prediction of the adjustment to be made to signals 239 for current time.

The phase noise predictor model 320 (such as second auto-regressive predictor) receives the sample value Y(n) from the summer 312. As previously discussed, the sample value Y(n)=CorrCPEn−CPEn. Based on the received sample value Y(n), the phase noise predictor model 320 produces feedback signal such as sample Y'(n)=Y(n+1), representing a predicted future value associated with the common phase error.

As further shown, the sign detector 325 of the predictive feedback compensation loop 299 receives the signal Y'(n) and produces respective signal 327. For a given input sample Y'(n), the sign detector 325 produces the signal 327 to be a value of 1 if the sample signal Y'(n) is greater than 0; the sign detector 325 produces the signal 327 to be a value of −1 if the sample signal Y'(n) is less than 0.

The scale factor 330 receives signal 327 and applies a gain of D to the received signal 327 to produce the signal 331. Time delay function 335 receives the signal 331 and delays received signal 331 to produce the signal 336.

As its name suggests, integrator function 340 integrates received values 336. For example, via the summer 313, the integrator function 340 sums each of the received samples of signal 336 to a current value of the corrected common phase error signal CorrCPE(n) to produce the next sample of the corrected common phase error signal CorrCPE(n) outputted from the function 345.

Over multiple samples, the negative feedback loop (e.g., predictive feedback compensation loop 299) biases the signal Y'(n) to be zero on average.

In one embodiment, the common phase error CPEn (phase adjustment information 270) compensates for: i) first phase noise associated with the wireless station 131, and ii) second phase noise associated with the wireless station UE1. The wireless station 131 and corresponding communication management resource 140 provide individual phase noise correction for each of multiple different instances of communication devices present in the network environment 100.

Accordingly, the signal processor resource hardware implements the predictive feedback compensation loop 299 to produce the phase adjustment information 272 (i.e., corrected common phase error signal CorrCPEn derived from the received phase adjustment information 270 (i.e., common phase error signal). The signal processor resource 350 such as including phase adjustor 240 uses the corrected common phase error signal CorrCPEn (phase adjustment information 272) to adjust phases of wireless signals communicated from the wireless station 131 to the wireless station UE1.

Thus, the predictive feedback compensation loop 299 iteratively produces successive samples of the corrected common phase error signal CorrCPEn based on successive received samples of the common phase error signal CPEn. The corrected common phase error signal CorrCPEn produced by the predictive feedback compensation loop 299 is a future prediction of the received common phase error signal CPEn.

In one embodiment, based on the phase error signal CorrCPEn, the phase adjustor 240 adjusts phases of multiple sub-carrier frequencies used to convey data over the wireless signals communicated from the wireless station 131 to the wireless station UE1. Application of the corrected common phase error signal CorrCPEn provides phase noise compensation for both the first phase noise which is associated with a first local oscillator 201-1 in the wireless station 131 and the second phase noise associated with a local oscillator 201-2 in the second wireless station UE1.

Figure 4:
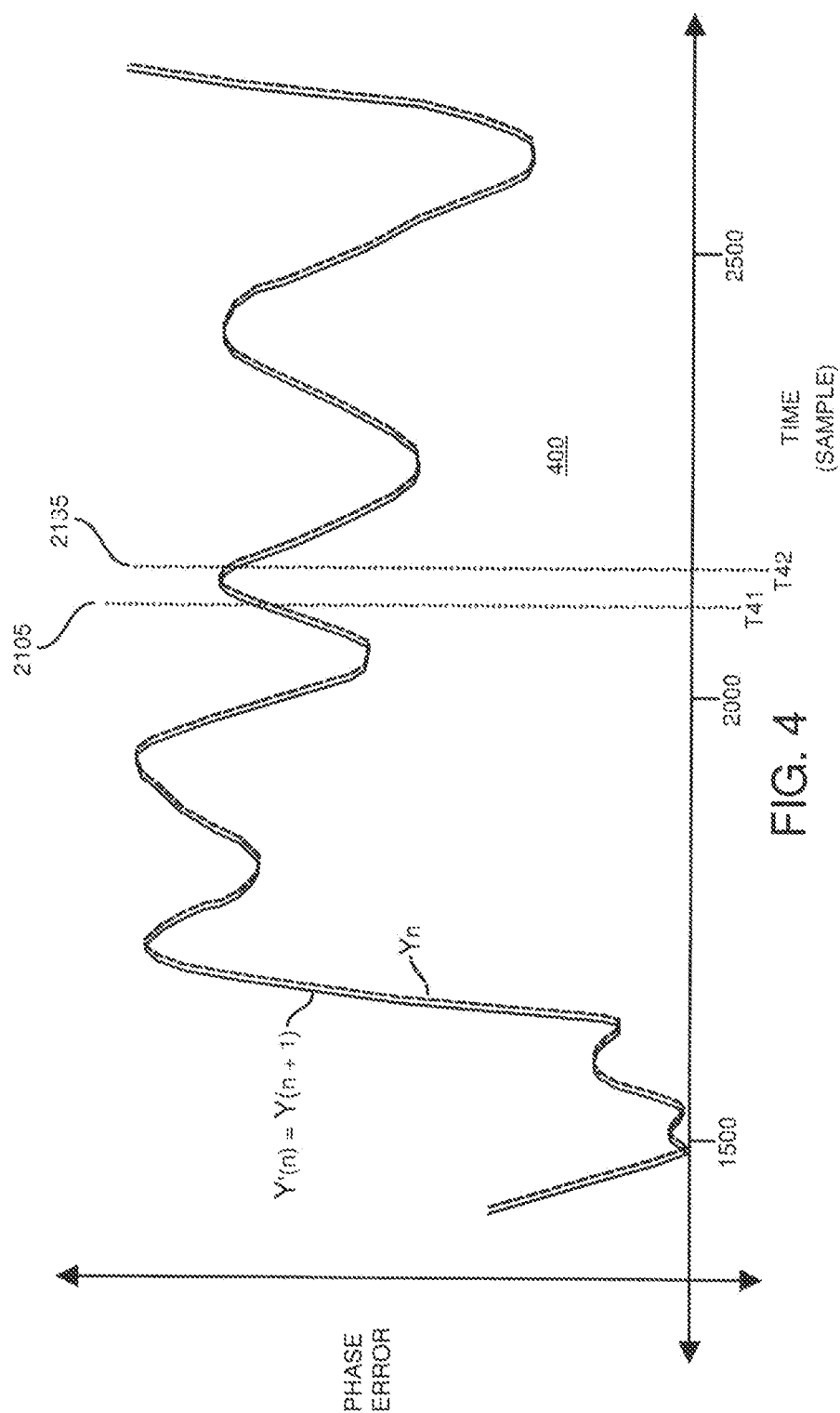
FIG. 4 is an example timing diagram illustrating first predicted common phase noise error and second predicted common phase noise error according to embodiments herein.

FIG. 4 is an example timing diagram illustrating first predicted common phase error and second predicted common phase error according to embodiments herein.

Graph 400 pictorially illustrates how the signal Y(n) is delayed by DELTA with respect to the signal Y'(n+1) produced by the phase noise predictor model 320. The signal Y'(n+1) as predicted by the predictive feedback compensation loop 299 is a more accurate representation of the common phase error because the phase noise predictor model 320 and corresponding predictive feedback compensation loop 299 provide an accurate future prediction of the common phase error. In one embodiment, the feedback signal (phase adjustment information 272) and corresponding predictive feedback compensation loop 299 filters (such as via integrator 340) or smooths out the estimated prediction of the common phase error by the operation of every sampling iteration of the loop. In other words, every iteration of the loop provides filtering, reducing the noise around the true value of the common phase error. More specifically, the loop provides smoothing of the estimation noise associated with the estimator itself. Additionally, the loop incorporates the prediction step to cope with any (potential) delay in receiving the latest common phase error estimate from the most recent OFDM symbol used to estimate a common phase error sample. As a more specific example, FIG. 5 provides a more detailed view of a window of time samples in graph 500 for Y(n) and Y'(n+1) for sample 2105 (corresponding to time T41) through sample 2135 (corresponding to time T42).

Figure 5:
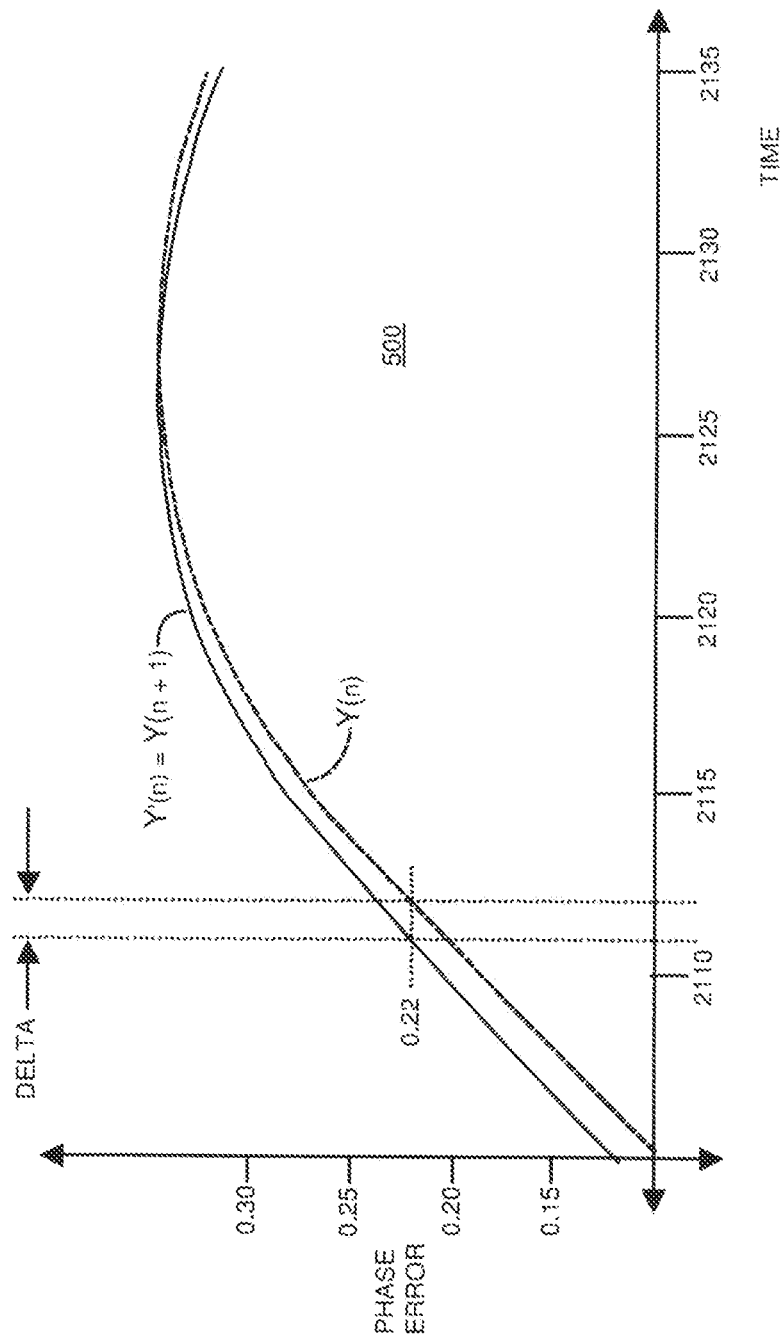
FIG. 5 is an example timing diagram illustrating first predicted common phase error and second (corrected) predicted common phase error according to embodiments herein.

FIG. 5 is an example timing diagram illustrating first predicted common phase error and second predicted common phase error according to embodiments herein.

In this example, the graph 500 illustrates how the phase noise predictor model 320 provides a more accurate generation of the common phase error signal. For example, as previously discussed, the signal Y(n) is a delayed component associated with the actual common phase error due to processing by the phase noise estimator 260. The phase noise predictor model 320 and corresponding predictive feedback compensation loop 299 provides an adjustment for the time delay DELTA, providing a more accurate or corrected common phase error for the present time. In other words, if the common phase error 270 represents a delayed prediction of the common phase error. When shifted via implementation of the predictive feedback compensation loop 229, the corrected common phase error CorrCPE is a better signal to provide phase noise correction.

As a more specific example, the graph 500 shows that the magnitude of Y'(n=2112)=Y (n=2111). Thus, the function Y' is approximately equal to the function Y, but the function Y' is shifted in time to the left (via negative DELTA) with respect to the function Y, correcting for the delay (DELTA) associated with the common phase error signal CPEn produced by the phase noise estimator 260.

Accordingly, the predictive feedback compensation loop 299 receives the first common phase error signal CPEn (such as phase adjustment information 270) from a first auto-regressive predictor (such as phase noise estimator 260). The first auto-regressive estimator 260 produces the common phase error signal CPEn (phase adjustment information 270) based on a first set of coefficients derived from monitoring wireless uplink communications from the second wireless station (UE1) to the wireless station 131. The predictive feedback compensation loop 299 produces the corrected common phase error signal CorrCPEn (such as phase adjustment information 272) based on a second auto-regressive predictor 320 (such as phase noise predictor model 320) disposed in the predictive feedback compensation loop 299. The second auto-regressive predictor 320 derives the corrected common phase error signal CorrCPEn (such as phase adjustment information 272) based at least in part on a second set of coefficients 257 derived from monitoring the wireless uplink communications from the wireless station UE1 to the wireless station 131.

Figure 6:
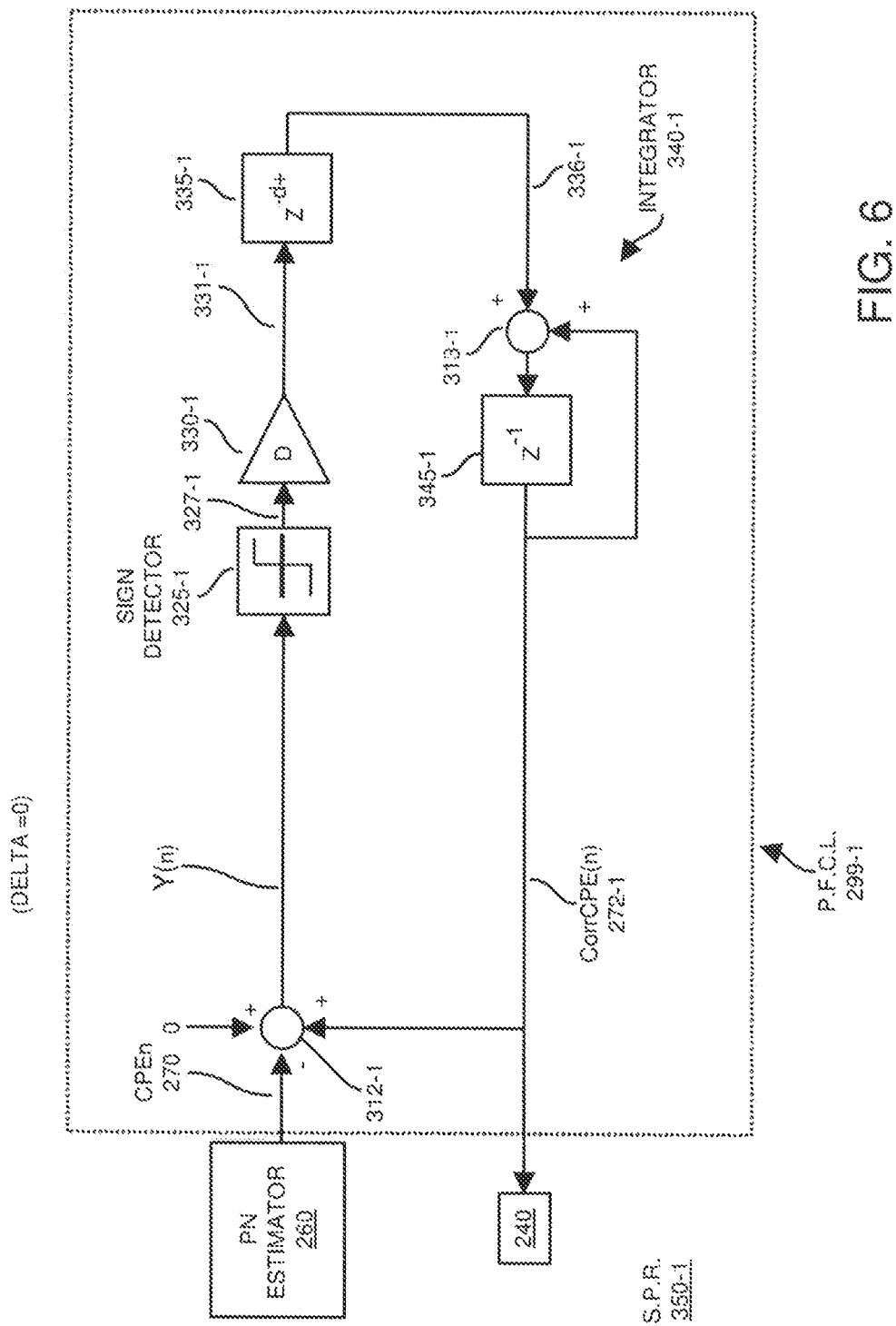
FIG. 6 is an example diagram illustrating a feedback loop according to embodiments herein.

FIG. 6 is an example diagram illustrating a feedback loop according to embodiments herein.

In this example embodiment, the signal processor resource 350-1 associated with the wireless station 131 and communication management resource 140 includes a predictive feedback compensation loop 299-1. Predictive feedback compensation loop 299-1 is an optional substitute to the predictive feedback compensation loop 299.

In one embodiment, the implementation of the predictive feedback compensation loop 299-1 includes summer 312-1, sign detector 325-1, amplifier 330-1, delay function 335-1, and integrator 340-1. Integrator function 340-1 includes summer 313-1 and delay function 345-1.

Note again that the signal processor resource 350-1 can be configured as signal processor hardware, signal processor software, or a combination of signal processor hardware and signal processor software.

As previously discussed, the predictive feedback compensation loop 299-1 receives the phase adjustment information 270 (a.k.a., a first common phase error signal such as CPE(n) representing a first guess as to the common phase error or phase noise error associated with the wireless stations) from the phase noise estimator 260 (such as a first auto-regressive predictor).

In this example embodiment, the value DELTA equals zero because the phase noise estimator 260 produces the common phase error signal CPEn with little or no delay. More specifically, in this example embodiment, the summer 312 receives a sample value of the common phase error signal CPE(n) (phase adjustment information 270) for sample time n. Given that the phase adjustment information 270 is CPE(n), the summer 312-1 produces the signal Y(n)=CorrCPE(n)−CPE(n), where CorrCPE(n) (phase adjustment information 272) represents the corrected common phase error signal. As discussed herein, the corrected common phase error signal (phase adjustment information 272) provides a more accurate prediction of the adjustment to be made to signals 239 for current time.

The sign detector 325-1 of the predictive feedback compensation loop 299-1 receives the signal Y(n) and produces respective signal 327-1. For a given input sample Y(n), the sign detector 325-1 (non-linear stage) produces the signal 327-1 to be a value of 1 if the signal Y(n) is greater than 0; the sign detector 325-1 produces the signal 327-1 to be a value of −1 if the signal Y(n) is less than 0.

The scale factor 330-1 receives signal 327-1 and applies a gain of D to the received signal 327-1 to produce the signal 331-1. Time delay function 335-1 receives the signal 331-1 and delays received signal 331-1 to produce the signal 336-1.

As its name suggests, integrator function 340-1 integrates received values 336-1. For example, via the summer 313-1, the integrator function 340-1 sums each of the received samples of signal 336-1 to a current value of the corrected common phase error signal CorrCPE(n) to produce the next sample of the corrected common phase error signal CorrCPE(n) outputted from the function 345-1.

Over multiple samples, the negative feedback loop (e.g., predictive feedback compensation loop 299-1) biases the signal Y(n) to be zero on average. The signal CPE(n) is susceptible to being noisy. The predictive feedback compensation loop 299-1 provides a way to filter or average the signal over time and provide tracking of the phase adjustment information 272 with respect to the received phase adjustment information 270.

Figure 7:
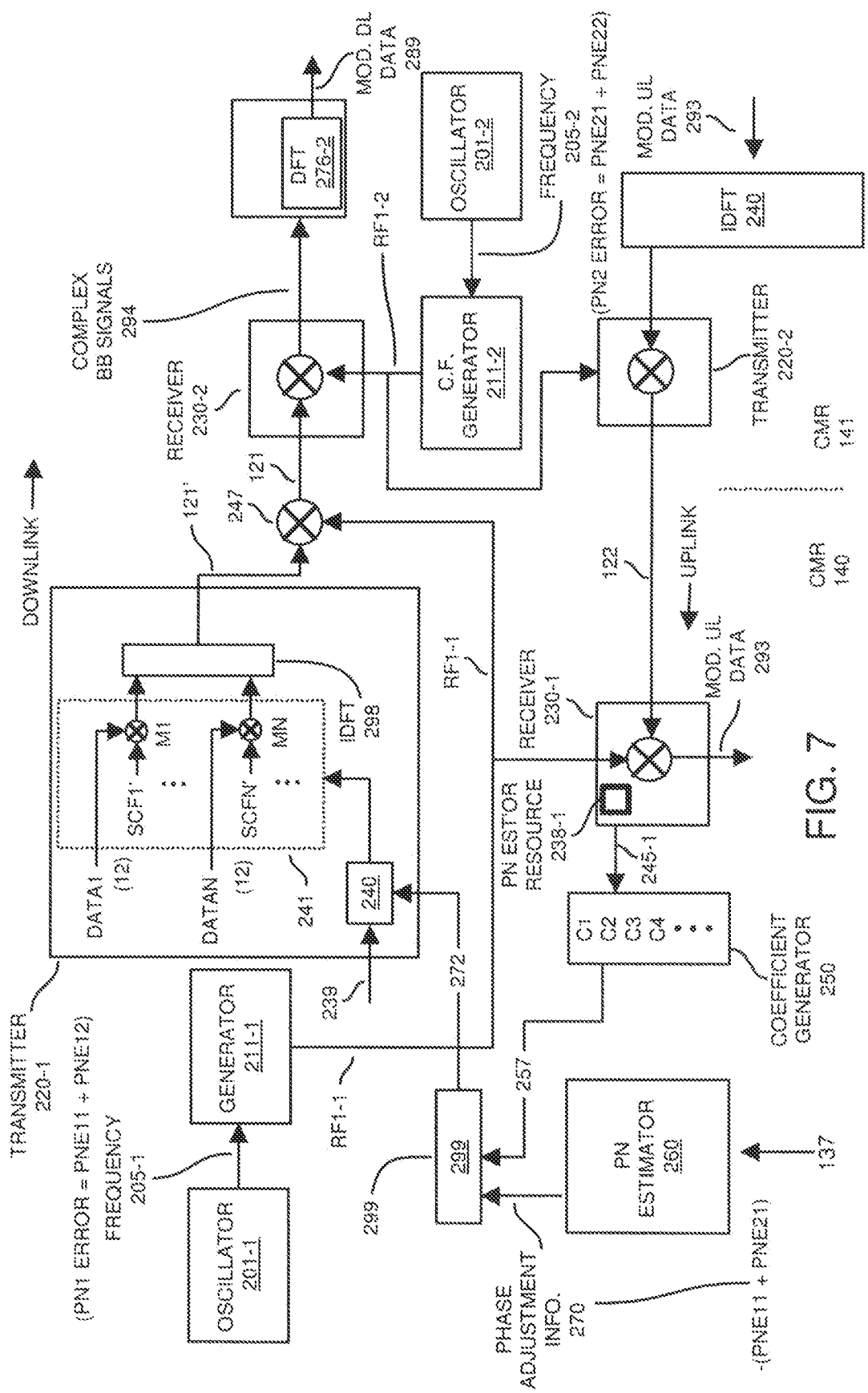
FIG. 7 is an example block diagram illustrating components of a wireless system and implementation of phase noise estimation and compensation in a wireless station (such as a wireless base station) according to embodiments herein.

FIG. 7 is an example block diagram illustrating components of a wireless system and implementation of a phase noise estimator in a wireless station (such as a wireless base station) according to embodiments herein.

As shown in this example embodiment, the communication management resource 140 (a.k.a., signal processor resource) associated with the wireless station 131 includes oscillator 201-1, generator 211-1, transmitter 220-1, receiver 230-1, coefficient generator 250, predictive feedback compensation loop 299 (or 299-1) and phase noise estimator 260. Transmitter 220-1 in this example embodiment includes phase adjustor 240.

The communication management resource 141 associated with the user equipment UE1 includes oscillator 201-2, generator 211-2, receiver 230-2, transmitter 220-2, and phase noise estimator resource 238-2.

In this example embodiment, the oscillator 201-1 (such as main clock) produces a frequency signal 205-1 supplied to the frequency generator 211-1. The frequency signal 205-1 is susceptible to phase noise, resulting in phase noise error including phase noise error PNE11 (such as correctable phase noise error) and PNE12 (such as non-correctable phase noise error).

The oscillator 201-2 produces a frequency signal 205-2 supplied to the frequency generator 211-2. The frequency signal 205-2 is susceptible to phase noise, resulting in phase noise error including phase noise error PNE21 (such as correctable phase noise error) and PNE22 (such as non-correctable phase noise error).

Embodiments herein include providing phase noise compensation (such as correction) for the generally correctable phase noise error PNE11 and phase noise error PNE21 as further discussed herein.

More specifically, as previously discussed, the phase adjustor 240 receives sub-carrier frequency signals 239 (such as sub-carrier frequency SCF1, sub-carrier frequency SCF2, sub-carrier frequency SCF3, . . . ) supplied to the transmitter 220-1. The phase adjustor 240 also receives phase adjustment information 272 (negative of the detected common phase error PNE11 and PNE21) from the predictive feedback compensation loop 299 in a manner as previously discussed. As its name suggests, the phase adjustment information 272 adjusts a respective phase associated with one or more signals associated with the wireless station 131.

Figure 9:
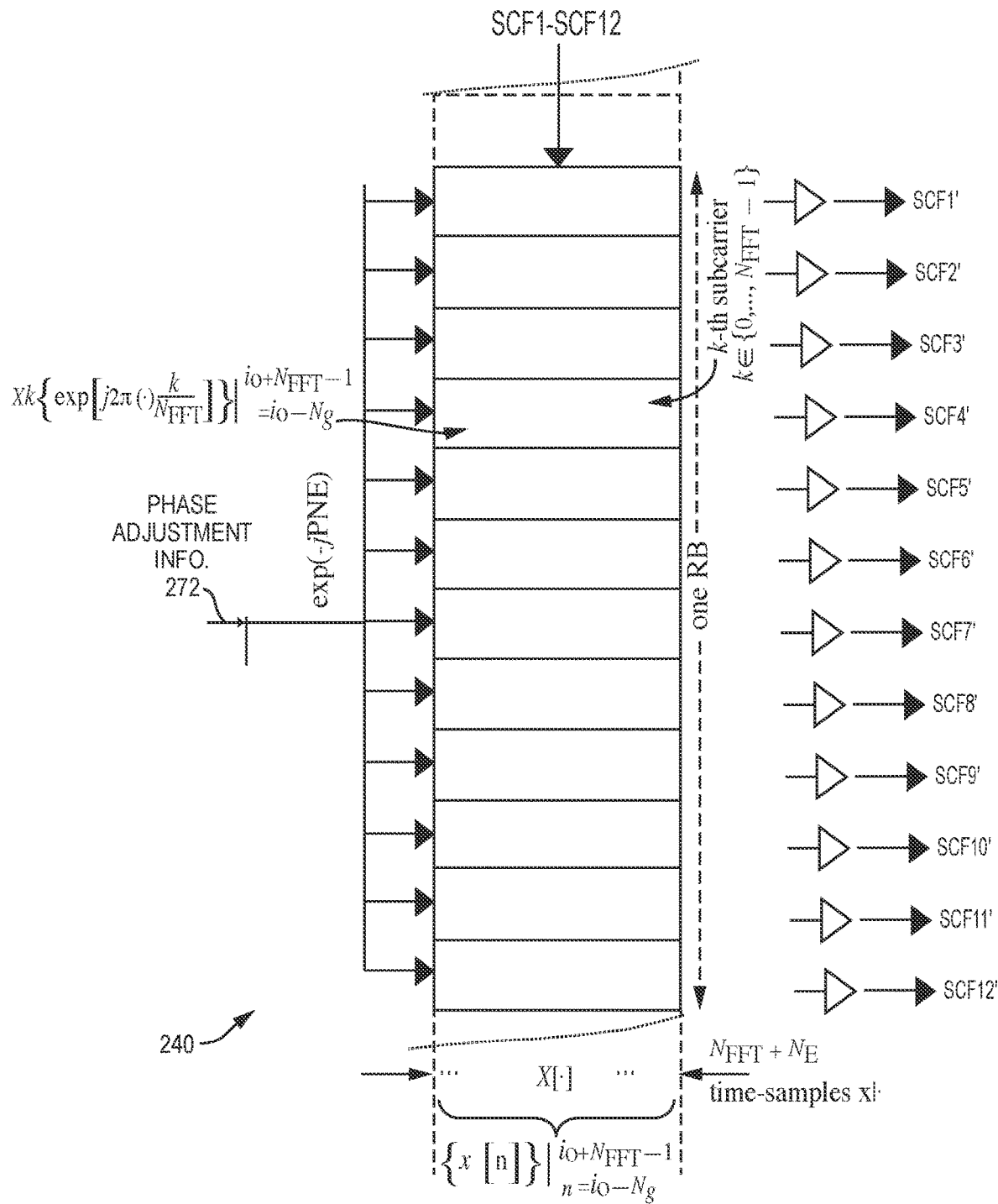
FIG. 9 is an example diagram illustrating implementation of phase noise adjustments in the frequency domain according to embodiments herein.

For example, in one embodiment, the phase adjustor 240 applies the phase adjustment information 272 (compensation information) to each of the sub-carrier frequencies 239 to produce phase noise compensated sub-carrier frequencies SCF1', SCF2', SCF3, . . . . An example is shown in FIG. 9.

Referring again to FIG. 7, transmitter 220-1 uses the phase noise compensated sub-carrier frequency signals SCF1', SCF2, SCF3', etc., to produce one or more wireless signals communicated to the IDFT (Inverse Discrete Fourier Transform) function 298. For example, the signal processor 241 includes a first multiplier M1 that modulates the sub-carrier frequency SCF1' via data DATA1 to produce a sequence of symbols modulated via the phase noise compensated sub-carrier frequency SCF1'. The signal processor 241 includes a second multiplier M2 that modulates the sub-carrier frequency SCF2' via data DATA2 to produce a sequence of symbols modulated via the sub-carrier frequency SCF2'; and so on. As further discussed herein, the communication management resource 140 of the wireless station 131 can be allocated any number of sub-carrier frequencies (such as 15 KHz bandwidth×12 sub-carrier frequencies per base resource block) to support communications in corresponding resource elements of one or more resource blocks.

The IDFT 298 receives the modulated signals produced by the multipliers M1, M2, etc., and produces corresponding signal 121' (time domain signal).

Multiplier 247 receives signal 121' and carrier frequency RF1-1 produced by the generator 211-1. Multiplier 247 outputs wireless communications 121 from the wireless station 131 over communication link 127-1 in the downlink direction to the communication management resource 141 associated with user equipment UE11.

In one embodiment, the phase adjustor 240 uses the phase adjustment information 272 as a basis to provide phase noise compensation (reducing phase noise error) to the one or more sub-carrier frequencies 239. Based on application of the phase adjustment information 272, the phase adjustor 240 eliminates at least a portion of phase noise associated with the sub-carrier frequencies 239 and/or corresponding signals communicated from the wireless station 131 to the user equipment UE1.

As previously discussed, the transmitter 220-1 uses data signals DATA1, DATA2, etc., (or pilot signals) to modulate the respective sub-carrier frequencies supporting communications 121 over the wireless communication link 127-1 to the user equipment UE 1.

At the user equipment UE1, the generator 211-2 uses the frequency signal 205-2 as a basis to produce carrier frequency RF1-2 (same RF carrier frequency as RF1-1) supplied to the receiver 230-2. The receiver 230-2 demodulates the received communications 121 to produce complex base-band signals 294 (such as including DATA1, DATA2, etc.) communicated from the wireless station 131 to the user equipment UE1. Via the base-band signals 294, the DFT (Discrete Fourier Transform) function 276-2 produces modulated downlink data 289 for further processing and retrieval of corresponding downlink transmitted data DATA1, DATA2, etc.

Referring again to FIG. 7, in further example embodiments, as previously discussed, the generator 211-2 uses the frequency signal 205-2 as a basis to produce one or more carrier frequency signals such as RF1-2. Transmitter 220-2 uses the carrier frequency RF1-2 as a basis in which to communicate uplink information, reference signals, etc., to the wireless station 131 transmitted over the uplink of the wireless communication link 127-1 to the communication management resource 140 of wireless station 131 for processing.

As further discussed herein, in addition to communicating data, the transmitter 220-2 transmits multiple reference signals such as PT-RS (Phase Tracking Reference Signal) signals, DM-RS (Demodulation Reference) signals, etc., via one or more sub-carrier frequencies in one or more different time slots. As further discussed herein, the reference signals can be spread across time (multiple time slots or resource elements) and/or frequency domains (channels).

In this example embodiment, the phase noise estimator resource 238-1 monitors the received pilot reference signals (such as PT-RS signals, DM-RS signals, etc.) from the transmitter 220-2 and produces phase noise information 245-1 associated with receipt of the reference signals in wireless communications 122. Note that details of such reference signals used to produce the phase noise information 245-1 is further discussed below in FIGS. 12-16.

Referring again to FIG. 7, the receiver 230-1 demodulates the received communications 122 with the carrier frequency RF1-1 (same frequency as RF1-2) to produce the phase noise information 245-1. In one embodiment, as previously discussed, such phase noise information 245-1 (produced by the phase noise estimator resource 238-1 monitoring reference signals from the user equipment UE1) captures information about the total phase noise error (a.k.a., common phase error PNE11+PNE21) associated with the oscillators 201-1 and 201-2.

In further example embodiments, the phase noise information 245-1 is stored in registers of the coefficient generator 250. Based on the generated phase noise information 245-1, the coefficient generator 250 generates and supplies corresponding phase noise coefficients (such as C1, C2, etc.) to the phase noise estimator 260. Based on the recently generated phase noise information 245-1 and corresponding derived coefficients 256, the phase noise estimator 260 produces the phase adjustment information 270.

Based on the generated phase noise information 245-1, the coefficient generator 250 generates and supplies corresponding phase noise coefficients 257 to the phase noise predictor model 320 of the predictive feedback compensation loop 299. In a manner as previously discussed, based on the derived coefficients 257 and phase adjustment information 270, the predictive feedback compensation loop 299 produces the phase adjustment information 272.

In one embodiment, as its name suggests, the phase adjustment (compensation) information 272 includes one or more phase adjustment settings (such as the detected phase noise error PNE11+PNE21) supplied to the phase adjustor 240. To provide phase noise pre-compensation at the wireless station 131, the phase adjustor 240 provides signal adjustments to remove respective phase noise error (common phase error such as PNE11+PNE21) from the subsequent communications 122 transmitted by the transmitter 220-2 of the user equipment UE1 to the wireless station 131.

As further discussed below in FIG. 9, embodiments herein include one or more of providing phase noise adjustments (compensation) via phase adjustor 240 in the frequency domain. Alternatively, note that the phase noise compensation can be achieved in a time domain (such as via modification of signal 121') rather than in the frequency domain via signal processor 241.

Referring again to FIG. 7, thus, in one embodiment, the communication management resource 140 (such as a phase noise management resource) associated with or in the first wireless station 131 generates phase noise information 245-1 via monitoring of the received wireless communications 122. The generated phase noise information 245-1 provides an estimate of a combination of common phase error associated with: i) first phase noise (PNE11) associated with the oscillator 201-1 of the wireless station 131, and ii) second phase noise (PNE21) associated with the local oscillator of the user equipment UE1. In this example embodiment, as previously discussed, the phase noise information 245-1 is generated by the phase noise estimator resource 238-1.

Based on the received phase noise information 245-1, the communication management resource 140 produces phase noise adjustment information 270. Via the phase noise adjustment information 270 and coefficients 257, the communication management resource 140 (and more specifically the phase adjustor 240) adjusts one or more signals associated with the wireless station 131. Adjustment of the one or more signals (such as adjustment of one or more sub-carrier frequencies) results in phase noise adjustment to both a first portion of phase noise (such as phase noise PE11) associated with the first wireless station 131 and a portion of second phase noise (such as phase noise PE21) associated with the second wireless station UE1.

Accordingly, embodiments herein include a method for estimating common phase error at the receiver (user equipment or wireless base station), in which the receiver exploits the separation between reference signals in frequency and/or time domains. If separation between adjacent CSI-RSs is larger than the extent of the ICI caused by one subcarrier, then the CSI-RSs do not cause ICI (Inter Carrier Interference) to one another, and a simple averaging of established phase noise will produce an estimate of common phase error as captured by the phase adjustment information 270.

In one embodiment, based on the received pilot symbols (such as reference signals PT-RS, DM-RS, etc.), the receiver averages phase noise determined over multiple CSI-RSs (received pilot signals) to estimate the mean phase noise such as common phase error associated with both oscillators. Further embodiments herein include a method for inserting reference signals, e.g., CSI-RSs. As previously discussed, appropriate spacing of the pilot these signals can be controlled in frequency and time domain. Separation of CSI-RSs, e.g. in code domain (e.g., PN), can be implemented in order to 'extract' only reference signals. This will eliminate or greatly reduce phase noise-induced ICI.

FIG. 8 is an example block diagram illustrating components of a wireless system and implementation of a first phase noise estimator in a first wireless station and a second phase noise estimator in a second wireless station according to embodiments herein.

In this example embodiment, in a similar manner as previously discussed, the phase noise estimator resource 238-2 produces the phase noise information 245-2 based on receipt of one or more reference signals from the wireless station 131. The user equipment UE1 and corresponding communication management resource 141 communicate the phase noise information 245-2 to the wireless station 131 in a manner as previously discussed with respect to FIG. 2.

Additionally, in a manner as previously discussed in FIG. 7, the wireless station 131 implements phase noise estimator resource 238-1 to monitor reference signals (pilot signals) received from the user equipment UE1 to produce phase noise information 245-1. The coefficient generator 250 uses a combination of the phase noise information 245-1 and the phase noise information 245-2 (such as average of such information) to produce the respective coefficients C1, C2, etc., associated with the phase noise estimator 260.

Thus, FIG. 8 illustrates implementing functionality from FIG. 2 and functionality from FIG. 7. In one embodiment, the phase noise estimator 260 or other suitable entity produces the phase adjustment information 270 based on a combination of the phase noise information 245-1 (generated by the wireless station 131) and the phase noise information 245-2 (generated by the user equipment UE1).

FIG. 9 is an example diagram illustrating implementation of phase noise adjustments in the frequency domain according to embodiments herein.

In this embodiment, the phase adjustor 240 provides phase noise compensation to or associated with each of multiple sub-carrier frequencies SCF1, SCF2, . . . , SCF12. For example, the phase adjustor 240 applies phase adjustment information 272 to each of the sub-carrier frequencies SCF1, SCF2, etc. Application of the complex phase adjustment information 272 to the sub-carrier frequency SCF1 results in phase noise compensated sub-carrier frequency SCF1'; application of the complex phase adjustment information 272 to the sub-carrier frequency SCF2 results in phase noise compensated sub-carrier frequency SCF2'; application of the complex phase adjustment information 272 to the sub-carrier frequency SCF3 results in phase noise compensated sub-carrier frequency SCF3'; and so on. Thus, application of the phase adjustment information 272 to the sub-carrier frequencies provides phase noise compensation with respect to phase noise error (PNE11 and PNE21).

In one embodiment, because the magnitude of the phase noise error changes over time, the value of the phase adjustment information 272 is constantly updated such that the phase adjustment information 272 more closely tracks the phase noise error.

Figure 10:
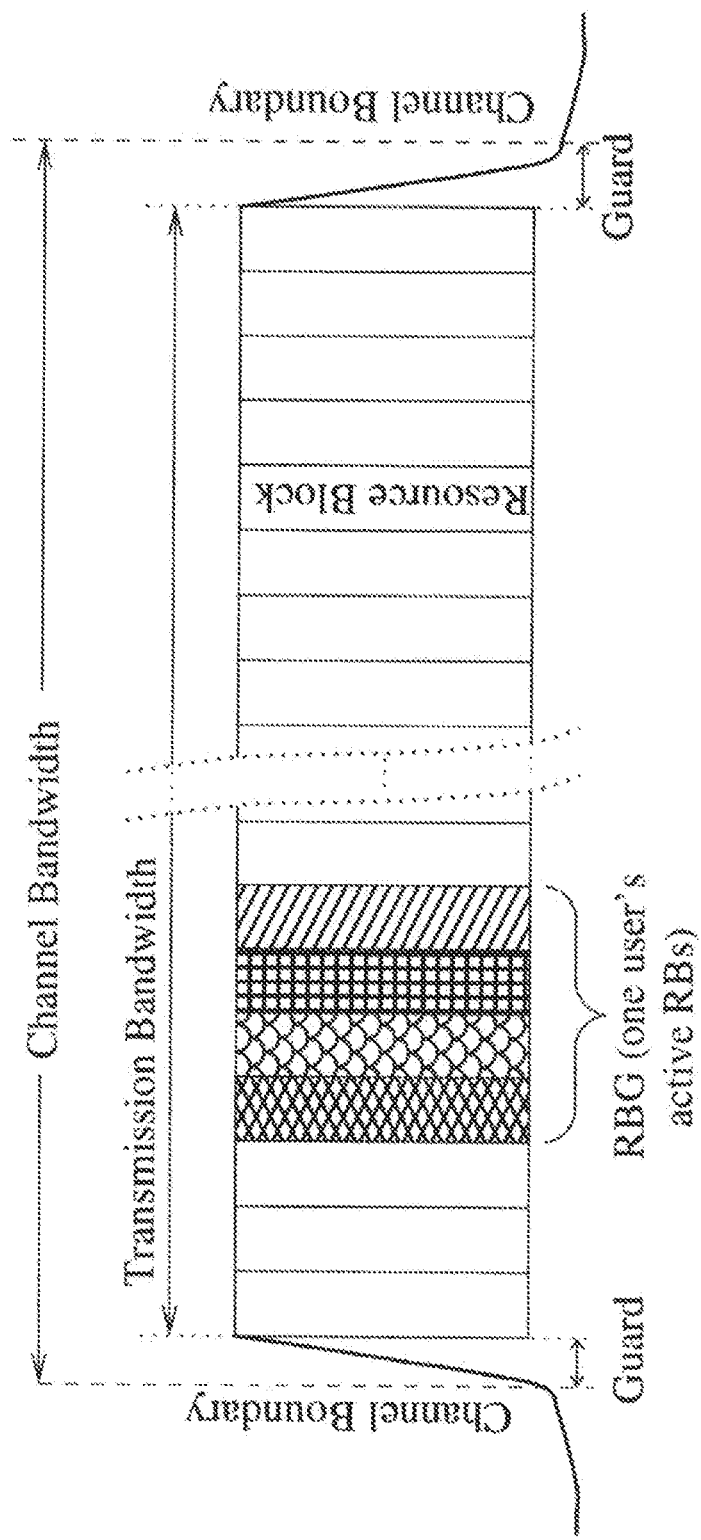
FIG. 10 is an example diagram illustrating allocation of a resource block group to a wireless station according to embodiments herein.

FIG. 10 is an example diagram illustrating allocation of a resource block group to a wireless station according to embodiments herein. Additional details of allocated resource blocks for uplink and downlink communications is further discussed below.

Figure 11:
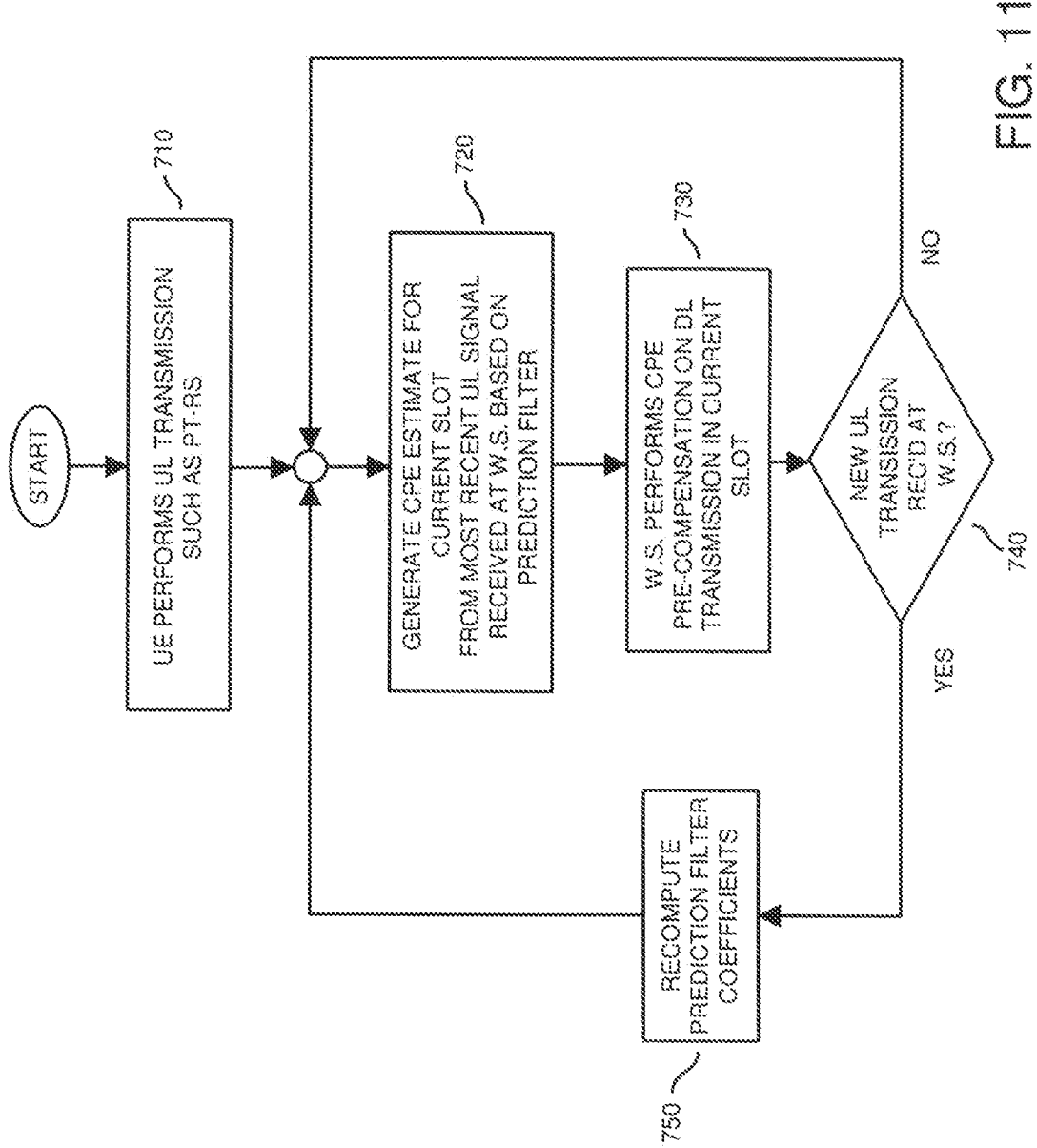
FIG. 11 is an example flowchart diagram illustrating implementation of phase noise estimation and phase noise compensation to generate first common phase error according to embodiments herein.

FIG. 11 is an example flowchart diagram illustrating implementation of phase noise compensation according to embodiments herein.

In this example embodiment, in processing operation 710, the user equipment UE1 performs transmission of pilot signals such as PT-RS (Phase Tracking Reference Signal) signals, DM-RS (Demodulation Reference) signals, etc., to the wireless station 131 in one or more assigned time slots, physical resource blocks, etc.

In processing operation 720, the phase noise estimator 260 generates a common phase error estimate (such as phase adjustment information 270) for a most recent one or more time slots of received communications 122 (and reference signals) from the user equipment UE1.

In processing operation 730, the wireless station 131 generates a phase adjustment information 270 from the estimated common phase error and performs common phase error pre-compensation on the downlink communications 121 in one or more subsequent time slots.

In processing operation 740, if a new uplink communication is received at the wireless station 131, the phase noise estimator resource 238-1 produces updated phase noise information 245-1 for use by the phase noise estimator 260 to produce the phase adjustment information 270 (one or more signals such as common phase error) used to adjust subsequent communications 121. In this manner, the common phase error estimation is constantly updated to be as accurate as possible. Alternatively, if no new uplink communication is received at the wireless station, the phase noise estimator resource 238-1 and phase noise estimator 260 use the previously received phase noise information 245-1 to produce the phase adjustment information 270 (one or more signals such as common phase error).

Figure 12:
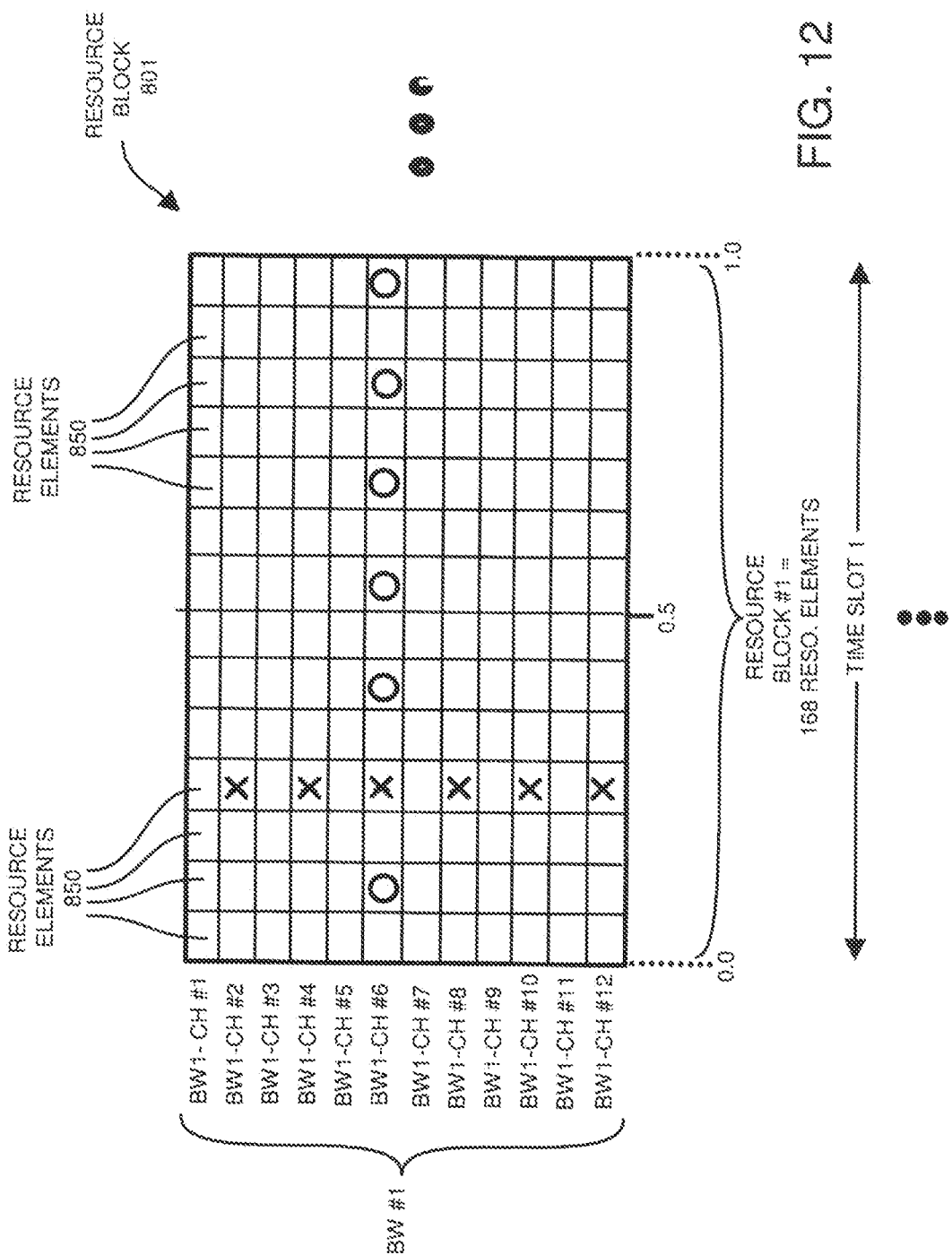
FIG. 12 is an example diagram illustrating a physical resource block and allocation of corresponding resource elements according to embodiments herein.

FIG. 12 is an example diagram illustrating a physical resource block and allocation of corresponding resource elements according to embodiments herein.

In this example embodiment, the physical resource block 801 includes multiple resource elements, each of which supports conveyance of a respective symbol. In the time domain, the physical resource block 801 falls within a time slot between time 0 and 1; the time slot #1 includes 14 sub-time slots, one for each symbol. In the time domain, the physical resource block 801 resides in bandwidth BW #1, including multiple sub-carrier frequencies in the base-band such as BW1-CH #1 (a.k.a., SCF1), BW1-CH #2 (a.k.a., SCF2), BW1-CH #3 (a.k.a., SCF3), . . . , BW1-CH #12 (a.k.a., SCF12). In one nonlimiting example embodiment, each sub-carrier frequency is spaced by 15 KHz; bandwidth BW1 therefore represents 180 KHz. In a manner as previously discussed, embodiments herein include providing compensation with respect to each of the sub-carrier frequencies when transmitting (such as elements of the resource block 801) in a downlink direction from the wireless station 131 to the user equipment UE1.

In this embodiment, pilot or reference symbols are scheduled for transmission from the first wireless station 131 to a second wireless station UE1 (or from the wireless station UE1 to the wireless station 131) in one or more of the resource elements 850 of the physical resource block 801. The pilot or reference symbols can be any suitable signals that serve phase tacking.

In one embodiment, the physical resource block 801 defines a schedule of communicating PT-RS and/or DM-RS signals that serve to assist phase tracking. For example, in one embodiment, the resource elements in the physical resource block 801 marked with an X represent scheduling of DM-RS signals; the resource elements in the physical resource block 801 marked with an O represent scheduling of PT-RS signals. Other resource elements 850 of the physical resource block 801 are used to communicate other data (such as DATA1, DATA2, etc.) between the wireless stations.

As further discussed below, each physical resource block can be assigned to support uplink or downlink communications. When resource block 801 and corresponding symbols in resource elements are transmitted in the uplink, the communication management resource 140 monitors the reference signals to generate the phase noise information 245-1. When resource block 801 and corresponding symbols in resource elements are transmitted in the downlink, the communication management resource 140 monitors the reference signals to generate the phase noise information 245-2.

Figure 13:
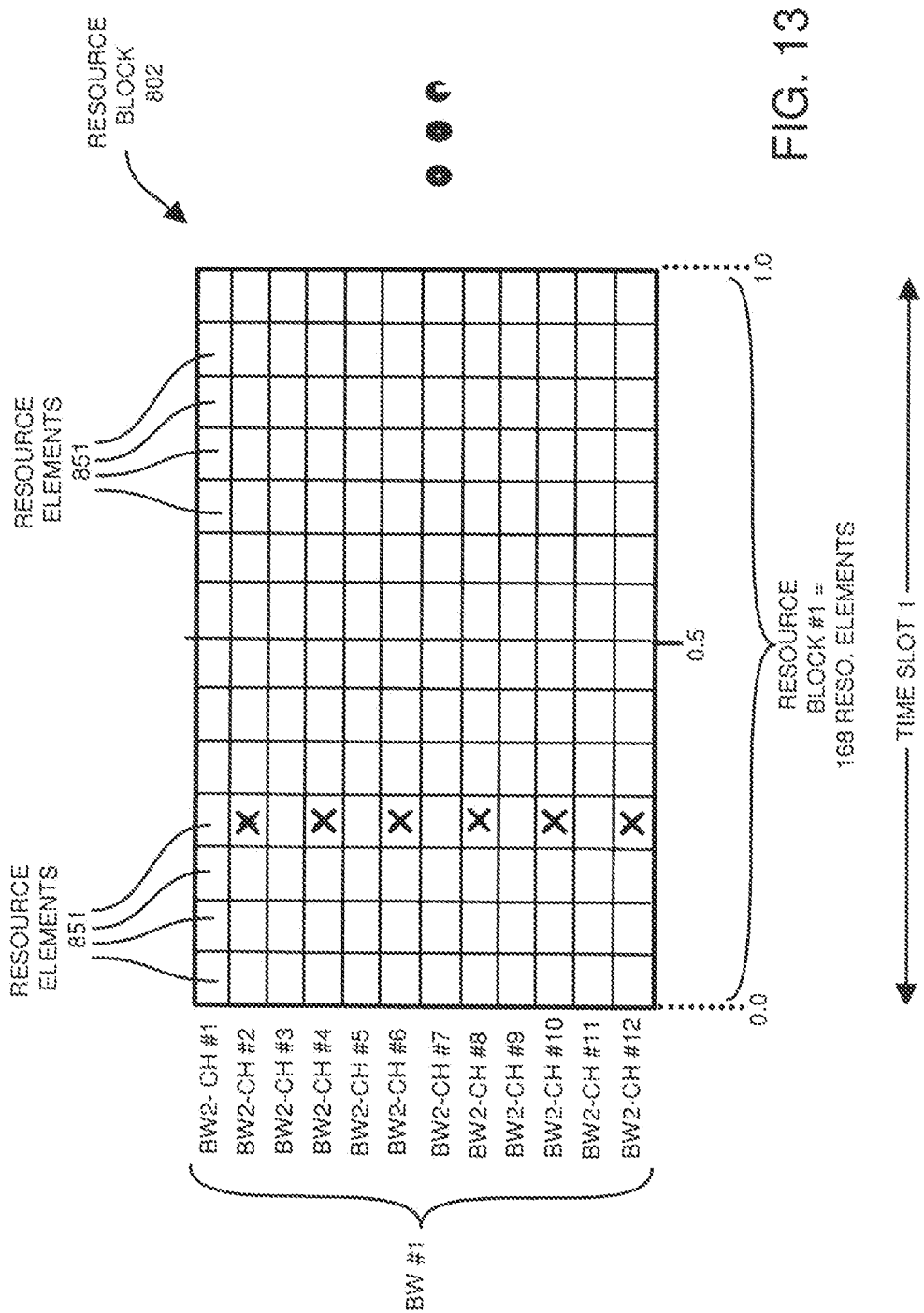
FIG. 13 is an example diagram illustrating a physical resource block and allocation of corresponding resource elements according to embodiments herein.

FIG. 13 is an example diagram illustrating a physical resource block and allocation of corresponding resource elements according to embodiments herein.

In this example embodiment, the physical resource block 802 includes multiple resource elements, each of which supports conveyance of a respective symbol. In the time domain, the physical resource block 802 falls within a time slot between time 0 and 1; the time slot #1 includes 14 sub-time slots, one for each symbol. In the time domain, the physical resource block 802 resides in bandwidth BW #2, including multiple sub-carrier frequencies (signal 137) BW2-CH #1, BW2-CH #2, BW2-CH #3, . . . , BW2-CH #12. In one nonlimiting example embodiment, each sub-carrier frequency in the base-band is spaced by 15 KHz, bandwidth BW2 represents 180 KHz.

In this embodiment, pilot or reference symbols are scheduled for transmission in one or more of the resource elements 851 of the physical resource block 802. The pilot or reference symbols can be any suitable signals that serve phase noise tracking. In further example embodiments, the physical resource block 802 defines a schedule of DM-RS signals that serve to assist phase tracking. For example, in one embodiment, the resource elements in the physical resource block 802 marked with an X represent scheduling of DM-RS signals.

Other resource elements 851 of the physical resource block 802 are used to communicate other data between the wireless stations.

As further discussed below, each physical resource block can be assigned to support uplink or downlink communications. When resource block 802 and corresponding symbols in resource elements are transmitted in the uplink, the communication management resource 140 monitors the reference signals to generate the phase noise information 245-1. When resource block 801 and corresponding symbols in resource elements are transmitted in the downlink, the communication management resource 140 monitors the reference signals to generate the phase noise information 245-2.

Figure 14:
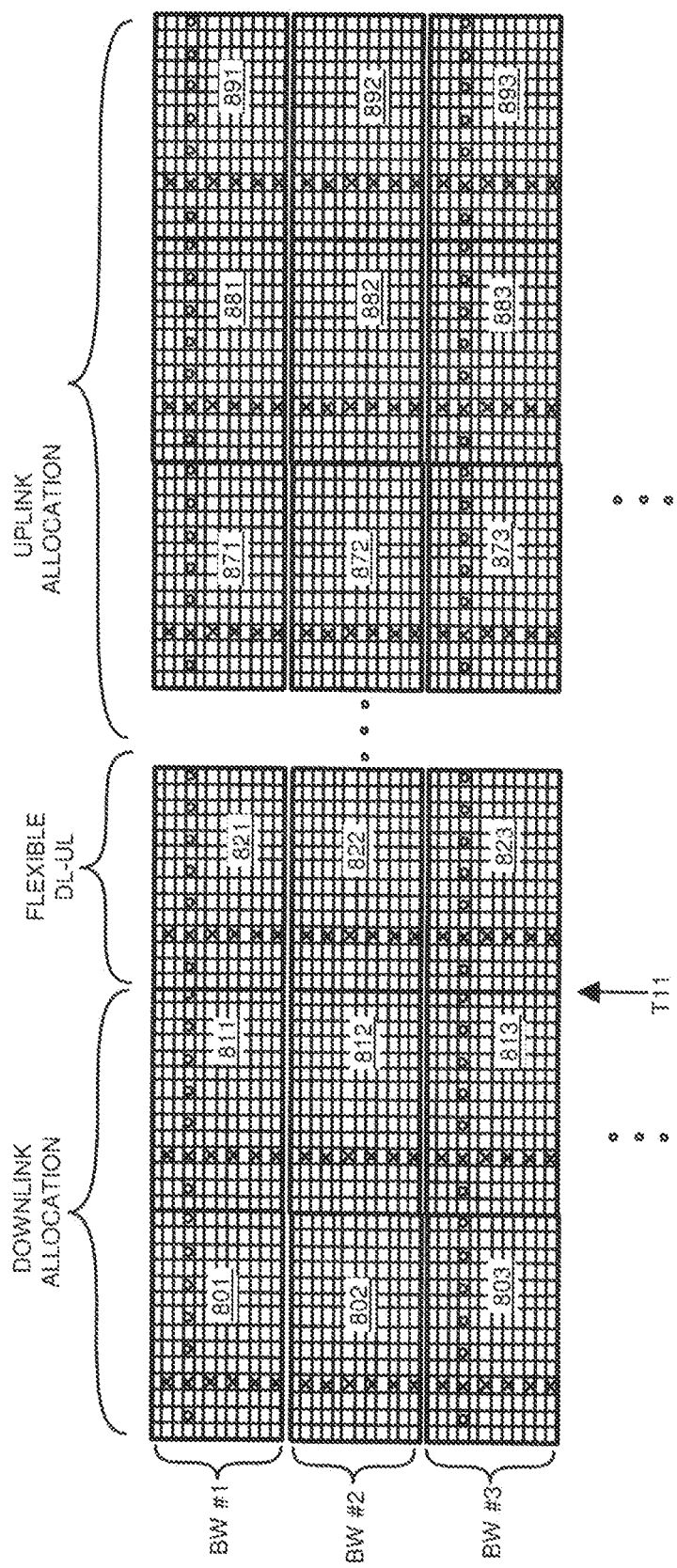
FIG. 14 is an example diagram illustrating implementation of multiple physical resource blocks and allocation of corresponding resource elements in the time domain and frequency domain to support downlink and uplink communications according to embodiments herein.

FIG. 14 is an example diagram illustrating implementation of multiple physical resource blocks and allocation of corresponding resource elements in the time domain and frequency domain to support downlink and uplink communications according to embodiments herein.

As previously discussed, bandwidth BW1 represents a first set of sub-carrier frequencies in which the communication management resource 140 applies compensation in a respective downlink in a manner as previously discussed; bandwidth BW2 represents a first set of sub-carrier frequencies in which the communication management resource 140 applies compensation in a respective downlink in a manner as previously discussed; bandwidth BW3 represents a first set of sub-carrier frequencies in which the communication management resource 140 applies compensation in a respective downlink in a manner as previously discussed; and so on.

In this example embodiment, the wireless station 131 or other suitable entity allocates use of the available wireless bandwidth for uplink and downlink communications. For example, in one embodiment, the resource blocks 801, 802, 803, . . . , resource blocks 811, 812, 813, . . . , are allocated to support downlink communications from the wireless station 131 to the user equipment UE1.

Certain resource blocks are flexible and can be allocated for uplink or downlink depending on the network conditions.

The resource blocks 821, 822, 823, . . . , resource blocks 871, 872, 873, resource blocks 881, 882, 883, . . . , resource blocks 891, 892, 893, . . . , are allocated to support uplink communications from the user equipment UE1 to the wireless station 131.

In one embodiment, in a manner as previously discussed, the resource elements in the physical resource blocks marked with an X represent scheduling of DM-RS signals; the resource elements in the physical resource block 802 marked with an O represent scheduling of PT-RS signals. Other resource elements 851 of the physical resource block 802 are used to communicate other data between the wireless stations.

Thus, in this example embodiment, multiple physical resource block are scheduled for data transmission with PT-RS density configured as (i) transmission in every other physical resource block (801, 811, 821, . . . , 871, 881, etc., 803, 813, 823, . . . , 873, 883, etc., as in the frequency domain, and (ii) every other OFDM symbol in the time domain.

Note that the DM-RS signal can be used for phase tracking in lieu of PT-RS since the PT-RS port is associated with a DM-RS antenna port (precoder is common but power may be different).

For PDSCH (Physical Downlink Shared CHANNEL), the subcarrier location (configurable by RRC or Radio Resource Control) of a PT-RS in a scheduled PRB is the same as one of the subcarriers used by the DM-RS of the lowest port number among the DM-RS ports used by the scheduled PDSCH.

PUSCH with CP-OFDM uses same design and procedures for PT-RS (albeit, default PT-RS is included with QPSK or Quadrature Phase Shift Keying, too).

A motivation for not transmitting PT-RS signals in one or more resource elements, if PT-RS time density is lower than every other OFDM symbol, is to reuse the CPE (derived from an OFDM symbol that contains a PT-RS) in one (or up to three) subsequent OFDM symbol(s).

In the example embodiment as discussed herein, phase noise prediction as discussed herein at the wireless station 131 (such as gNb or gNode B) supplies a common phase error prediction value and applies pre-compensation for each OFDM symbol communicated in the downlink.

Figure 15:
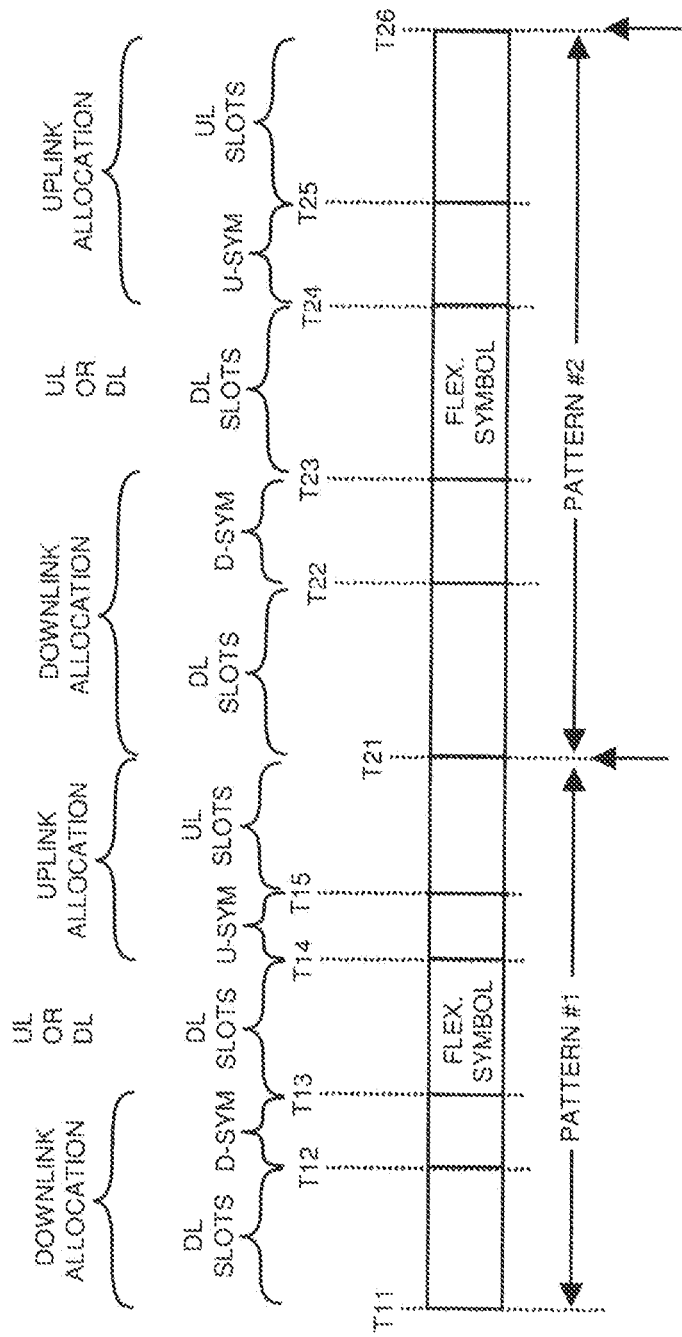
FIG. 15 is an example diagram illustrating allocation of uplink and downlink resources according to embodiments herein.

FIG. 15 is an example diagram illustrating allocation of uplink and downlink resources according to embodiments herein.

In this example embodiment, the IE TDD-UL-DL-Config is used to determine allocation of the Uplink/Downlink TDD (Time-Division Duplex) configuration used to communicate data from the wireless station 131 to the user equipment UE1 and vice versa. Both, UE- and cell—specific IEs exist—in one embodiment, assume former in the sequel.

In further example embodiments, the tdd-UL-DL-ConfigurationCommon provides (aside from a reference SCS configuration µref), a pattern1 and optionally a pattern2.

If pattern2 is present then the user equipment UE1 can be configured for two slot formats at a time, as shown in FIG. 15.

There are a number of full downlink slots, a number of first OFDM symbols at the beginning of the slot following the last full downlink slot, a number of consecutive full uplink slots at the end of each DL-UL pattern, and a number of consecutive uplink symbols in the end of the slot preceding the first full uplink slot. Remaining OFDM symbols are flexible symbols.

A straightforward exemplary embodiment as discussed herein may include the following operations:

1—Configure the wireless station 131 and the user equipment UE1 to communicate in accordance with pattern1 and a pattern2

2—Use the uplink transmissions (such as between T15 and T21) at the end of pattern1 to train the autoregressive (AR) model of the predictor at the wireless station 131

3—Implement coefficients as previously discussed to generate the phase adjustment information 270

4—Akaike criterion may indicate an order no larger than 20; 10 is typical for a spectrum with one spike (cf. PN spectrum)

5—Use the AR predictor model to predict CPE in the OFDM symbols at the beginning of pattern2 and communicating from the wireless station 131 to the user equipment UE1

In some embodiments prediction might be single step or multi-step (see current art)

6—Re-train the AR model (such as phase noise predictor model 320) during the uplink transmissions at the end of pattern2

7—Go to operation 5 and continue, if the UE1 has further contiguous scheduling

Accordingly, with reference to FIG. 11, in one embodiment, between T11 and T14, the wireless station 131 allocates downlink resources (such as one or more physical resource blocks) as previously discussed to support communications from the wireless station 131 to the user equipment UE1. The downstream communications include one or more pilot symbols communicated to the user equipment UE11 as well as data. In one embodiment, the user equipment UE11 monitors phase noise and produces respective phase noise information based on the downlink communications. The wireless station 131 receives the phase noise information and provides pre-compensation in respective downlink slots such as between T21 and T24.

It is noted that the phase noise information and respective phase noise error changes over time. The immediate use of the phase noise information to update any phase noise error associated with downstream (downlink) communications ensures that the phase noise error correction is fairly up to date.

Figure 16:
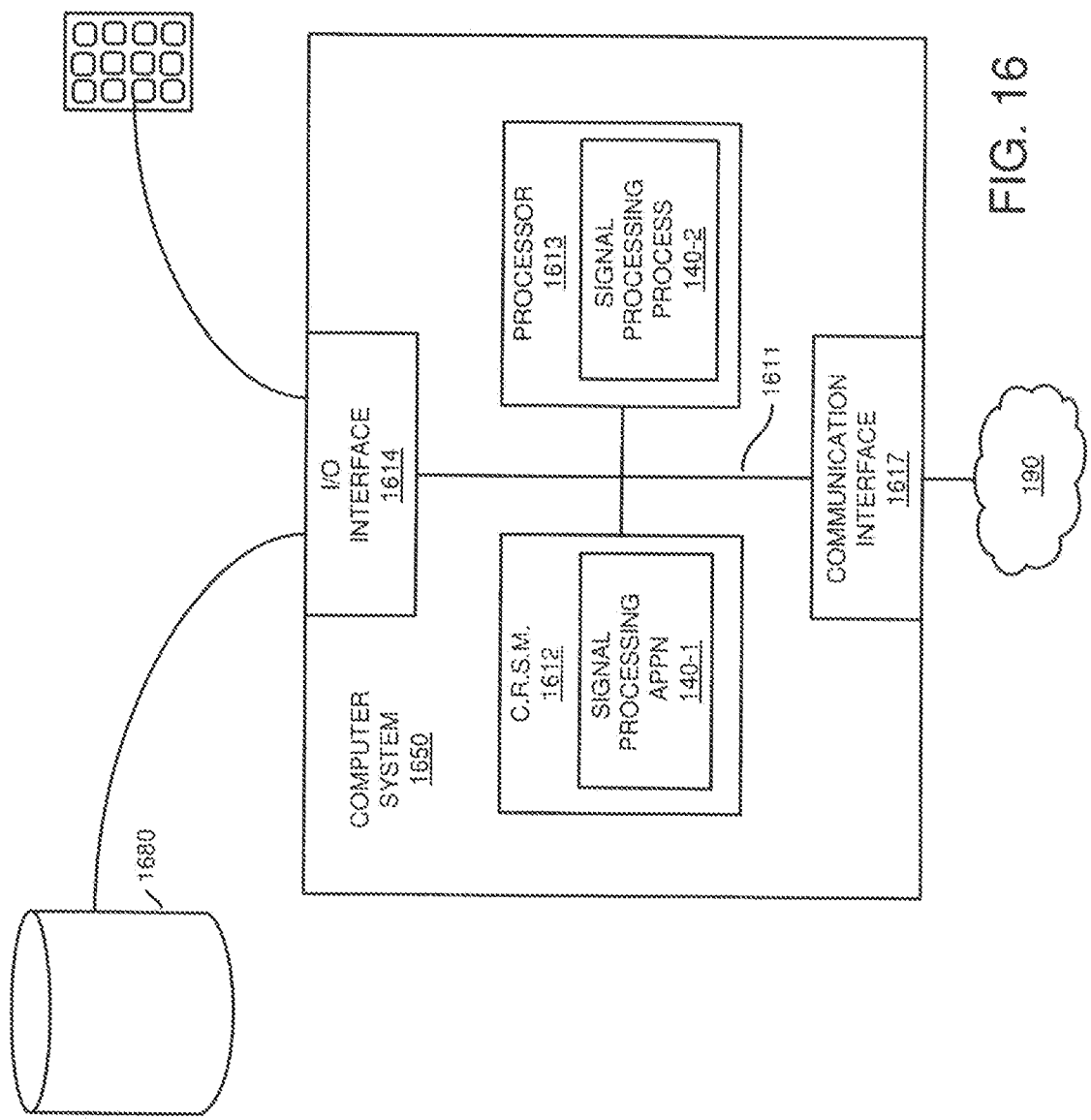
FIG. 16 is an example diagram illustrating example computer architecture operable to execute one or more operations according to embodiments herein.

FIG. 16 is an example block diagram of a computer system for implementing any of the operations as previously discussed according to embodiments herein.

Any of the resources (such as wireless station 131, user equipment UE1, communication management resource 140, communication management resource 141, coefficient generator 250, phase noise estimator 260, phase adjustor 240, etc.) as discussed herein can be configured to include computer processor hardware and/or corresponding executable instructions to carry out the different operations as discussed herein.

As shown, computer system 1650 of the present example includes interconnect 1611 coupling computer readable storage media 1612 such as a non-transitory type of media (which can be any suitable type of hardware storage medium in which digital information can be stored and or retrieved), a processor 1613 (computer processor hardware), I/O interface 1614, and a communications interface 1617.

I/O interface(s) 1614 supports connectivity to repository 1680 and input resource 1692.

Computer readable storage medium 1612 can be any hardware storage device such as memory, optical storage, hard drive, floppy disk, etc. In one embodiment, the computer readable storage medium 1612 stores instructions and/or data.

As shown, computer readable storage media 1612 can be encoded with communication management application 140-1 (e.g., including instructions) in a respective wireless station to carry out any of the operations as discussed herein.

During operation of one embodiment, processor 1613 accesses computer readable storage media 1612 via the use of interconnect 1611 in order to launch, run, execute, interpret or otherwise perform the instructions in communication management application 140-1 stored on computer readable storage medium 1612. Execution of the communication management application 140-1 produces communication management process 140-2 to carry out any of the operations and/or processes as discussed herein.

Those skilled in the art will understand that the computer system 1650 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1650 may reside at any location or can be included in any suitable resource in any network environment to implement functionality as discussed herein.

Functionality supported by the different resources will now be discussed via flowcharts in FIG. 17. Note that the steps in the flowcharts below can be executed in any suitable order.

Figure 17:
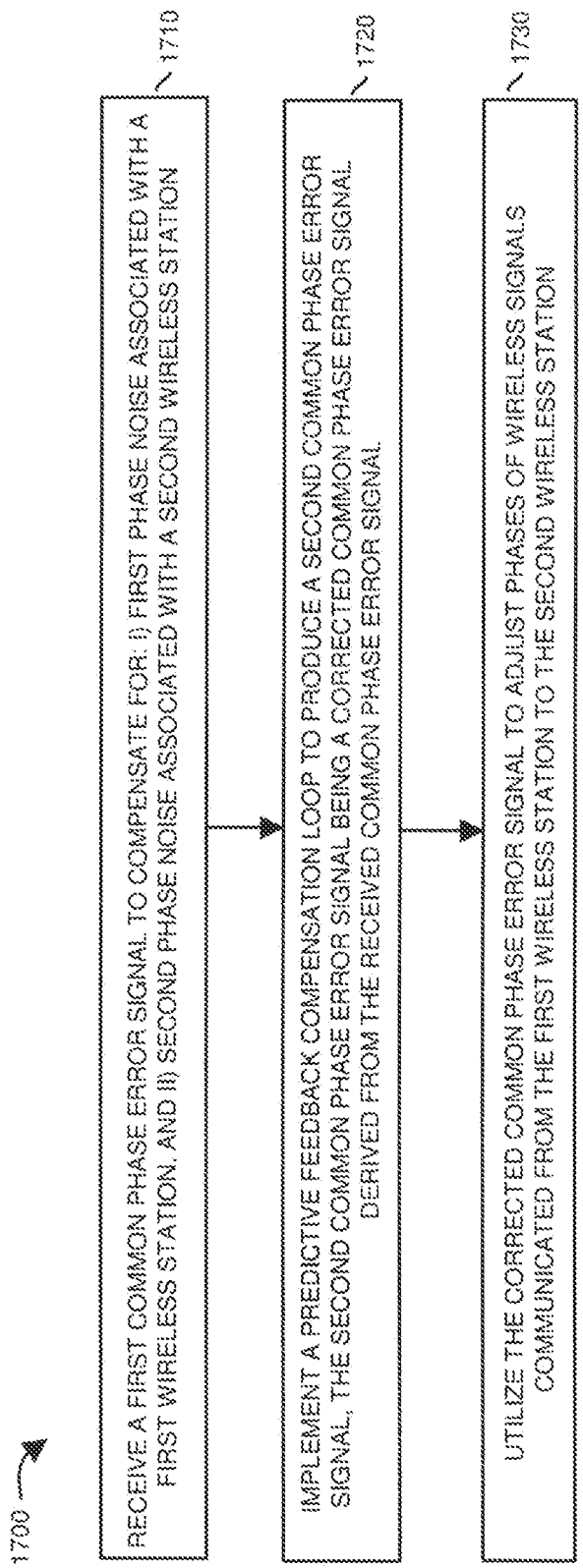
FIG. 17 is an example diagram illustrating a method according to embodiments herein.

FIG. 17 is a flowchart 1700 illustrating an example method according to embodiments herein. Note that there will be some overlap with respect to concepts as discussed above.

In processing operation 1710, the signal processor hardware 140 receives a first common phase error signal to compensate for: i) first phase noise associated with a first wireless station, and ii) second phase noise associated with a second wireless station.

In processing operation 1720, the signal processor hardware implements a predictive feedback compensation loop to produce a second common phase error signal, the second common phase error signal being a corrected common phase error signal derived from the received common phase error signal.

In processing operation 1730, the signal processor hardware 140 utilizes the corrected common phase error signal to adjust phases of wireless signals communicated from the first wireless station to the second wireless station.

Further Embodiments

Method for (i) remote pre-compensation for the PN observed at the receiver-side, whereby said pre-compensation of CPE is enacted at the opposite end of the link (transmitter-side)—while, further (ii) implementing a negative feedback mechanism aimed at both reducing the variance of closed-loop (CL) prediction error and compensating for some implementation-related delay Thus alleviating the common phase prediction error;

Performance is now driven by the variance of Yn—as reduced by the CL's (predictive feedback compensation loop) operations;

Particular merits ∃ when NR operates in a millimeter-wave frequency range (high SCS; 52.6-71 GHz as exemplary scenario).

Moreover, prediction errors are being actively reduced by the closed-loop action (per negative feedback)—even in the presence of some implementation-related delay in obtaining a CPE estimate (or prediction)

Wireless base station implements either, or both, the prediction and/or the predictor state update in a closed-loop form, across (preferably successive) OFDM symbols;

UE may, in some embodiments, send opportunistically CPE estimates to BS (on, say, PUCCH) to mitigate particular circumstances UE may, in some embodiments, send the AR coefficients—the predictor coefficients—that it may choose to derive during initial random access or opportunistically (i.e., according to a reduced duty cycle) at opportunistic (favorable) times during a TDD pattern;

Note again that techniques herein are well suited to facilitate use of a shared wireless channel amongst different types of wireless stations. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
   at a first wireless station:
   receiving a first common phase error signal to compensate for: i) first phase noise associated with the first wireless station, and ii) second phase noise associated with a second wireless station;
   implementing a predictive feedback compensation loop to produce a second common phase error signal, the second common phase error signal being a corrected common phase error signal derived from the first common phase error signal;
   utilizing the corrected common phase error signal to adjust phases of first wireless signals communicated from the first wireless station to the second wireless station; and
   wherein the first common phase error signal captures both: i) a first phase error associated with a first carrier frequency used by the first wireless station to wirelessly transmit first communications from the first wireless station to the second wireless station, and ii) a second phase error associated with a second carrier frequency used by the second wireless station to wirelessly transmit second communications from the second wireless station to the first wireless station.

2. The method as in claim 1, wherein the predictive feedback compensation loop is operative to iteratively produce samples of the second common phase error signal based on samples of the first common phase error signal.

3. The method as in claim 2, wherein a time duration between each of the samples of the corrected common phase error signal is equal to a time duration of a symbol transmitted from the second wireless station to the first wireless station.

4. The method as in claim 1, wherein the corrected common phase error signal produced by the predictive feedback compensation loop is a future prediction of the received first common phase error signal.

5. The method as in claim 1 further comprising:
receiving a new estimate of a common phase error signal associated with a newly received symbol from the second wireless station;
supplying the estimate as the first common phase error signal to the predictive feedback compensation loop; and
via an auto-regressive predictor implemented in the predictive feedback compensation loop, producing a feedback signal in the predictive feedback compensation loop based on a received delay value.

6. The method as in claim 5, wherein the received delay value indicates a delay between processing wireless uplink reference signals received from the second wireless station and producing the first common phase error signal.

7. The method as in claim 5, wherein the received delay value represents a delay between the corrected common phase error signal and the received first common phase error signal.

8. The method as in claim 1, wherein implementing the predictive feedback compensation loop to produce the corrected common phase error signal includes:
via the predictive feedback compensation loop, generating the second common phase error signal based at least in part on a delay associated with the received first common phase error signal.

9. The method as in claim 1, wherein utilizing the second common phase error signal to adjust phases of the first wireless signals includes: based on the second common phase error signal, adjusting phases of multiple sub-carrier frequencies used to convey data over the first wireless signals wirelessly communicated from the first wireless station to the second wireless station.

10. The method as in claim 1, wherein the second common phase error signal provides phase noise compensation for both the first phase noise which is associated with a first local oscillator in the first wireless station and the second phase noise which is associated with a second local oscillator in the second wireless station.

11. The method as in claim 1, wherein the predictive feedback compensation loop includes an integrator to produce samples of the corrected common phase error signal.

12. The method as in claim 1 further comprising:
producing the second common phase error signal based on an auto-regressive predictor disposed in the predictive feedback compensation loop, the auto-regressive predictor operative to derive the second common phase error signal based at least in part on a set of coefficients derived from monitoring wireless communications communicated in an uplink direction from the second wireless station to the first wireless station.

13. The method as in claim 1, wherein the first phase noise is associated with the first carrier frequency supporting wireless transmission of first wireless communications from the first wireless station to the second wireless station.

14. The method as in claim 13, wherein the second phase noise is associated with the second carrier frequency supporting wireless transmission of second wireless communications from the second wireless station to the first wireless station.

15. The method as in claim 1, wherein the first wireless station is a wireless base station; and
wherein the second wireless station is a mobile communication device in wireless communication with the wireless base station.

16. The method as in claim 1, wherein the second phase noise associated with the second wireless station is determined based upon wireless reference signals transmitted from the second wireless station.

17. The method as in claim 1 further comprising:
via a demodulator in the first wireless station, demodulating second wireless communications transmitted from the second wireless station to the first wireless station; and
producing phase noise information from the demodulated second wireless communications.

18. The method as in claim 17 further comprising:
deriving a set of coefficients based on the phase noise information; and
supplying the set of coefficients to the predictive feedback compensation loop.

19. The method as in claim 18, wherein implementing the predictive feedback compensation loop includes:
implementing a predictor model in the predictive feedback compensation loop; and
controlling operation of the predictor model using the set of coefficients.

20. The method as in claim 1 further comprising:
at the first wireless station: i) receiving phase noise information generated by a phase noise estimator in the second wireless station, the phase noise estimator generating the phase noise information based on wireless reference signals transmitted from the first wireless station to the second wireless station; and ii) using the phase noise information to control operation of the predictive feedback compensation loop.

21. A system comprising:
signal processor hardware operative to:
receive a first common phase error signal to compensate for: i) first phase noise associated with a first wireless station, and ii) second phase noise associated with a second wireless station;
implement a predictive feedback compensation loop to produce a second common phase error signal, the second common phase error signal being a corrected common phase error signal derived from the first common phase error signal;
utilize the corrected common phase error signal to adjust phases of wireless signals communicated from the first wireless station to the second wireless station; and
wherein the first common phase error signal captures both: i) a first phase error associated with a first carrier frequency used by the first wireless station to wirelessly transmit first communications from the first wireless station to the second wireless station, and ii) a second phase error associated with a second carrier frequency used by the second wireless station to wirelessly transmit second communications from the second wireless station to the first wireless station.

22. The system as in claim 21, wherein the predictive feedback compensation loop is operative to iteratively produce samples of the second common phase error signal based on samples of the first common phase error signal.

23. The system as in claim 22, wherein a time duration between each of the samples of the corrected common phase error signal is equal to a time duration of a symbol transmitted from the second wireless station to the first wireless station.

24. The system as in claim 21 wherein the corrected common phase error signal produced by the predictive feedback compensation loop is a future prediction of the received first common phase error signal.

25. The system as in claim 21, wherein the signal processor hardware is further operative to:
generate a new estimate of a common phase error signal associated with a newly received symbol;
supply the new estimate as the first common phase error signal to the predictive feedback compensation loop; and
via an auto-regressive predictor implemented in the predictive feedback compensation loop, produce a feedback signal in the predictive feedback compensation loop based on a received delay value.

26. The system as in claim 25, wherein the received delay value indicates a delay between processing wireless uplink reference signals received from the second wireless station and producing the first common phase error signal.

27. The system as in claim 25, wherein the received delay value represents a delay between the second common phase error signal and the first common phase error signal.

28. The system as in claim 21, wherein the signal processor hardware is further operative to:
via the predictive feedback compensation loop, generate the second common phase error signal based at least in part on a delay associated with the received first common phase error signal.

29. The system as in claim 21, wherein the signal processor hardware is further operative to:
based on the second common phase error signal, adjust phases of multiple sub-carrier frequencies used to convey data over the wireless signals communicated from the first wireless station to the second wireless station.

30. The system as in claim 21, wherein the second common phase error signal provides phase noise compensation for both the first phase noise which is associated with a first local oscillator in the first wireless station and the second phase noise which is associated with a second local oscillator in the second wireless station.

31. The system as in claim 21, wherein the predictive feedback compensation loop includes an integrator to produce samples of the corrected common phase error signal.

32. The system as in claim 21, wherein the signal processor hardware is further operative to:
produce the second common phase error signal based on an auto-regressive predictor disposed in the predictive feedback compensation loop, the auto-regressive predictor operative to derive the second common phase error signal based at least in part on a set of coefficients derived from monitoring wireless uplink communications communicated from the second wireless station to the first wireless station.

33. A method comprising:
at a first wireless station:
receiving a first common phase error signal to compensate for: i) first phase noise associated with the first wireless station, and ii) second phase noise associated with a second wireless station;
implementing a predictive feedback compensation loop to produce a second common phase error signal, the second common phase error signal being a corrected common phase error signal derived from the first common phase error signal;
utilizing the corrected common phase error signal to adjust phases of first wireless signals communicated from the first wireless station to the second wireless station;
wherein the first phase noise is associated with a first carrier frequency supporting wireless transmission of first wireless communications from the first wireless station to the second wireless station;
wherein the second phase noise is associated with a second carrier frequency supporting wireless transmission of second wireless communications from the second wireless station to the first wireless station;
wherein implementing the predictive feedback compensation loop to produce the second common phase error signal includes:
receiving coefficients derived from the second wireless communications; and
applying the received coefficients in the predictive feedback compensation loop to convert the first common phase error signal into the second common phase error signal.

34. The method as in claim 33 further comprising:
via the predictive feedback compensation loop, generating the second common phase error signal based at least in part on a delay associated with the received first common phase error signal.

* * * * *